(12) United States Patent
Hunwick

(10) Patent No.: US 10,131,968 B2
(45) Date of Patent: Nov. 20, 2018

(54) RECOVERY OF LITHIUM FROM SILICATE MINERALS

(71) Applicant: Richard Hunwick, Roseville Nsw (AU)

(72) Inventor: Richard Hunwick, Roseville Nsw (AU)

(*) Notice: Subject to any disclaimer, the term of this patent is extended or adjusted under 35 U.S.C. 154(b) by 123 days.

(21) Appl. No.: 15/085,580

(22) Filed: Mar. 30, 2016

(65) Prior Publication Data

US 2017/0175228 A1 Jun. 22, 2017

(30) Foreign Application Priority Data

Dec. 22, 2015 (AU) .................................. 2015905317
Mar. 2, 2016 (AU) .................................. 2016900774

(51) Int. Cl.
| | |
|---|---|
| *C22B 26/00* | (2006.01) |
| *C22B 26/12* | (2006.01) |
| *C22B 3/02* | (2006.01) |
| *C22B 3/06* | (2006.01) |
| *C22B 3/22* | (2006.01) |
| *C22B 3/44* | (2006.01) |

(52) U.S. Cl.
CPC ............... *C22B 26/12* (2013.01); *C22B 3/02* (2013.01); *C22B 3/065* (2013.01); *C22B 3/22* (2013.01); *C22B 3/44* (2013.01); *Y02P 10/234* (2015.11)

(58) Field of Classification Search
CPC .......... C22B 26/12; C22B 3/065; C22B 3/22; C22B 3/44
USPC ...................... 423/179.5, 395, 421, 641, 643
See application file for complete search history.

(56) References Cited

U.S. PATENT DOCUMENTS

| | | | | | |
|---|---|---|---|---|---|
| 1,531,336 | A | * | 3/1925 | Halvorsen ................. | C01F 7/66 423/125 |
| 1,863,986 | A | * | 6/1932 | Jourdan .................... | C01D 9/06 423/111 |
| 1,976,564 | A | * | 10/1934 | Jourdan .................... | C01D 9/06 165/263 |
| 2,021,988 | A | * | 11/1935 | Corson .................... | C01D 15/00 423/179.5 |
| 2,024,026 | A | * | 12/1935 | Coleman ................. | C22B 26/12 423/179.5 |

FOREIGN PATENT DOCUMENTS

| | | | |
|---|---|---|---|
| GB | 402977 | * | 12/1933 |
| JP | H024442 A | | 1/1990 |
| WO | 2011/082444 A1 | | 7/2011 |
| WO | 2013/140039 A1 | | 9/2013 |
| WO | 2014/026217 A1 | | 2/2014 |
| WO | 2015/123762 A1 | | 8/2015 |
| WO | 2015/155684 A2 | | 10/2015 |

* cited by examiner

*Primary Examiner* — Steven J Bos
(74) *Attorney, Agent, or Firm* — Mintz Levin Cohn Ferris Glovsky and Popeo, P.C.; Peter F. Corless

(57) ABSTRACT

A process is disclosed for recovering lithium from a lithium-containing silicate mineral. The process comprises mixing the silicate mineral with nitric acid. The process also comprises subjecting the mixture to a leaching process having conditions such that lithium values in the silicate mineral are leached into an aqueous phase as lithium nitrate. The leaching process conditions may be controlled such that non-lithium values in the silicate mineral tend not to be leached into the aqueous phase.

18 Claims, 4 Drawing Sheets

RECOVERY OF LITHIUM FROM SILICATE MINERALS

CROSS-REFERENCE TO RELATED APPLICATION

This application claims under 35 U.S.C. § 119(a) the benefit of Australian Patent Application Nos. 2015905317, filed Dec. 22, 2015 and 2016900774, filed Mar. 2, 2016, the entire contents of which are incorporated herein by reference.

TECHNICAL FIELD

A process, system and apparatus are disclosed for the recovery of lithium from silicate minerals that include lithium, including hard-rock minerals, and clay and micaceous minerals. The main chemical consumed in the process can be carbon dioxide that is recovered from flue gas streams, including any that arise from process equipment used elsewhere in the process of converting lithium silicate minerals to products in demand by users of lithium chemicals (in particular lithium carbonate and lithium hydroxide).

BACKGROUND ART

Lithium occurs widely throughout the Earth's crust, its average concentration is around 20 parts per million. This concentration compares with that of other valuable metals such as cobalt, but is much lower than iron and aluminium, yet it is far more abundant than the precious metals gold and platinum. But the metal is widely dispersed and high-grade deposits appear to be uncommon and generally small, so known economic resources may be inadequate to meet requirements for applications where its use is likely to grow substantially over coming years and decades, notably batteries.

Lithium batteries even now allow electricity to be stored in usefully large quantities per unit of battery weight: at least 150 Watt-hours per kilogram (Wh/kg), preferably 250 Wh/kg, with perhaps 1,500 Wh/kg possible in the longer term. Such storage intensities will allow electricity to penetrate road transport markets hitherto entirely dominated by petroleum fuels, and accelerate the development and deployment of electricity generation systems utilising the inherently intermittent renewable energy forms: wind and sun.

Recovering lithium from seawater is likely to remain prohibitively expensive because of its very low concentrations (less than 0.2 parts per million by weight), even though the total quantity in seawater vastly exceeds any foreseeable demands, at more than 200 billion tonnes of the metal.

Economic supplies of the lithium chemicals needed to make lithium batteries are currently dominated by brines from South American salt lakes (salars) in the so-called 'Lithium Triangle' that extends across areas of Argentina, Bolivia and Chile. However, security of supply from these salars is jeopardised by sovereign risk issues, environmental challenges, and doubts over just how much economically recoverable lithium is contained in these salars.

Lithium is also recovered from certain hard-rock silicate minerals. However, until recently, there was little interest in exploring for hard-rock lithium mineral deposits, firstly because perceptions have been that there was an abundance of lithium in the salars of the Lithium Triangle; and, secondly, because current hard-rock lithium ore refining processes (largely unchanged since before World War II) are expensive, complicated, hazardous and environmentally challenging.

With the benefit of a markedly superior process, the world's hard-rock lithium resources may be developed to the benefit of battery manufacturers, affording them greater confidence that lithium supplies for batteries will be secure over the longer term, and met at lower overall cost, than otherwise.

A reference herein to the background or prior art does not constitute an admission that such art forms part of the common and/or general knowledge of a person of ordinary skill in the art. Such a reference is not intended in any way to limit the process and system as set forth herein.

SUMMARY OF THE DISCLOSURE

Disclosed herein is an improved process for recovering lithium from a lithium-containing silicate mineral, such as hard-rock minerals which may be frequently found in a class of crystalline rocks known as pegmatites. The hard-rock lithium-containing silicates minerals can include spodumene ($LiAlSi_2O_6$) and/or any of a range of other lithium-containing silicate minerals, including but not limited to, petalite $LiAlSi_4O_{10}$, eucryptite $LiAlSiO_4$, amblygonite $(Li,Na)AlPO_4(F,OH)$, and various minerals in the mica group including lepidolite $K(Li,Al,Rb)_3(Al,Si)_4O_{10}(F,OH)_2$ and zinnwaldite $KLiFeAl(AlSi_3)O_{10}(OH,F)_2$. Lithium may also be present in certain clays that are the result of partial weathering of such minerals including hectorite $Na_{0.3}(Mg,Li)_3Si_4O_{10}(OH)_2$ and in the newly discovered (2006) sodium-lithium borosilicate mineral jadarite $LiNaSiB_3O_7(OH)$.

The process can comprise mixing the silicate mineral with nitric acid. The use of nitric acid as a lixiviant can, as will be explained hereafter, allow for conversion of the extracted lithium values into, for example, a pure form of lithium hydroxide. Lithium hydroxide is suitable for direct sale to customers who may prefer to purchase their lithium requirements as the hydroxide (for example for the manufacture of lithium batteries). Lithium hydroxide can also allow for control of pH during various stages of the process, as will be explained hereafter. Lithium hydroxide can further allow for capture of carbon dioxide produced in the process, converting the hydroxide to the carbonate in desired quantities (with lithium carbonate being another form suitable for sale, such as for the manufacture of lithium batteries). The lithium hydroxide-lithium carbonate gas scrubbing system will also be explained hereafter.

The process can recover lithium in marketable forms, notably in the hydroxide (either in the anhydrous form LiOH or in the monohydrate form $LiOH.H_2O$) and carbonate forms (lithium accounting is usually expressed in the industry in terms of lithium carbonate equivalent or LCE).

The process can avoid the need to purchase and consume expensive and hazardous chemicals such as sulphuric acid and sodium carbonate (soda ash). The process can avoid the production of unwanted by-products such as sodium sulphate or analcite (analcime). The process may also involve a minimum of processing steps. The process can also be environmentally benign, including limiting emissions of the greenhouse gas carbon dioxide.

In an embodiment, prior to mixing the silicate mineral with the nitric acid solution, the silicate mineral may be pre-treated to render the lithium values therein more amenable to leaching by nitric acid. For example, the native (as-mined) lithium-aluminium silicate mineral spodumene is typically in an unreactive α (alpha) form. The silicate mineral pre-treatment may comprise thermal treatment (such as calcination or roasting). Alternatively, the pre-treatment may be non-thermal (e.g. mechanical treatment), such as may be provided by the ultrafine or high-intensity grinding of the mineral to produce intense mechanical shear (e.g. in a stirred mill such as an ISAMILL™).

When the silicate mineral is thermally treated, it may thereafter be milled (e.g. in a roller mill) and then separated (e.g. in a cyclone) from a resultant hot gas stream, prior to being mixed with the nitric acid solution. Mechanical treatment may, on the other hand, avoid this separation stage. Thus, depending on the process set-up, such milling may or may not be required.

When the step of pre-treating the silicate mineral comprises thermal treatment, such as may involve the burning of e.g. a fossil fuel such as natural gas, a gaseous fluid stream that is produced, being a resultant flue gas, can contain carbon dioxide that, in turn, may be scrubbed with a slurry containing a proportion of lithium hydroxide and/or lithium carbonate in an aqueous phase.

The process as disclosed herein can comprise subjecting the mixture of silicate mineral with nitric acid to a leaching process. The leaching process can take place in one or more stages, and may be conducted under conditions such that lithium values in the silicate mineral are leached into an aqueous phase as lithium nitrates. The leaching process conditions may be controlled to minimise the quantities of non-lithium values that can be present in the silicate mineral (e.g. aluminium, iron and other transition metals including nickel, chromium, manganese and cobalt; the alkaline-earth metals calcium and magnesium; and, the phosphate ion) and that are leached into the aqueous phase. If leached out, the non-lithium values may be separated (e.g. precipitated, etc.) out of the aqueous phase.

In one embodiment, the leaching process conditions may comprise increasing the temperature and/or pressure of the leaching process so as to accelerate leaching of lithium values into the aqueous phase as lithium nitrates.

For example, the silicate mineral and nitric acid can be reacted together at elevated temperatures (e.g. ~170° C.) and elevated pressures (e.g. ~20 Bar pressure), e.g. in a digestion reactor, such as an autoclave. It has been shown, for example, that it is possible to extract 95% of the lithium in a sample of calcined (β) spodumene under pressure in such a reactor at a temperature of 170° C. in under an hour.

Alternatively, the silicate mineral and nitric acid can be reacted together at elevated temperatures (e.g. 100°-120° C.) but at atmospheric pressures. Such a reaction may also take place in a digestion reactor, in this case not a pressure vessel, but a reactor that is e.g. in the form of a vertical silo reactor.

In an embodiment, the leaching process conditions may comprise reacting the silicate mineral in a stoichiometric excess of nitric acid to ensure maximum extraction of the lithium from the silicate mineral. The time period of leaching can be controlled to help maximise the extraction of lithium values from the silicate mineral, whilst also helping to minimise the extraction of "impurities" present in the lithium-rich silicate mineral, including the aforementioned aluminium, iron, other transition and alkaline earth metals and the phosphate ion.

The controlled time period may be terminated by neutralising or otherwise removing residual free nitric acid. This may occur in one or more stages (e.g. vessels) that are separate to the leaching stage. A number of alternative approaches to terminating the leaching process may be employed, each of which can lead to distinct embodiments of the process. It is to be understood that such embodiments may be comprised of combinations of the variations as set forth herein.

In one embodiment for the termination of leaching, neutralisation alone may be employed. This embodiment may comprise adjusting the pH of the leaching solution, which initially is strongly acidic due to the presence of residual free excess unreacted nitric acid, to close to pH neutral. For example, the residual free nitric acid may be neutralised by recycling a proportion of alkaline lithium compounds (e.g. one or more of: $Li_2O$, $LiOH$ and $Li_2CO_3$, either in solution or as fine crystals in suspension) that are produced as part of the process for recovering lithium.

Advantageous outcomes of the neutralisation by lithium hydroxide and/or carbonate can include the conversion of free nitric acid to more lithium nitrate, as well as the conversion of the nitrates of aluminium, iron and other transition metals and alkaline earth metals to their insoluble oxide or hydroxide forms.

Suitable equipment for conducting the neutralisation reaction may include simple covered tanks (there may be just one, or two or more tanks operating in series). Each tank may be fitted with an agitator or other means (e.g. an air-sparging system) to maintain any insoluble solids in suspension. An extended mixing time may be required. This is because the reactions, e.g. wherein the nitrates of aluminium in particular hydrolyse, are best conducted slowly, so that the resulting e.g. aluminium hydroxide particles are discrete and crystalline (rather than gel-like) and have favourable settling, filtering and washing properties. This can allow such particles to be processed and removed in typical solids-liquids separation equipment and systems.

In alternative embodiments, instead of solely relying on neutralising all of the residual nitric acid using alkaline intermediates such as lithium hydroxide, the leaching process may be substantially terminated, and much of the excess nitric acid recovered, by physical means.

For example, in one embodiment, the product of the leaching process may first be heated so as to distil off as vapours the excess of nitric acid along with the free water present. In an embodiment, the dried solids mass may then be further heated to a temperature approaching ~200° C., i.e. sufficient to decompose aluminium, iron and other transition-metal nitrates to their respective insoluble oxides or hydroxides. This heating can also cause the release of further oxides of nitrogen and oxygen, which can be captured and transferred to join with the nitric acid and water vapour produced in the drying stage.

Thus, by converting the aluminium, iron and transition-metal nitrate impurities into insoluble products, they may be added to the residual solids material that remains after the leaching stage. In contrast, the lithium values can remain in a soluble form such that, in a subsequent stage, they can be readily extracted into aqueous solution (e.g. such as by being extracted into a pH-neutral solution). This pH-neutral solution may be produced by recycling e.g. a relatively smaller proportion of the lithium hydroxide and/or lithium carbonate product as an aqueous solution or slurry.

The excess of nitric acid and water may be distilled off in a drying stage that employs a hollow flight screw conveyor for example the BEPEX THERMASCREW™ or the METSO HOLO-FLITE™. These and similar screw conveyors can be fully enclosed, and can be operated under slight negative pressure to prevent the emission of oxides of nitrogen and nitric acid vapours. Alternatively, the conveyors may be confined within a sealed pressure vessel to allow them to operate at elevated pressures, for example, 10 Bar to 20 Bar (i.e. to match the pressures under which the upstream digestion stage may be carried out). As set forth below, the nitric acid and water vapours may be collected for use in regenerating nitric acid (e.g. a solution of nitric acid can be produced in a dedicated nitric acid production plant which acid may then be reused in the process).

The drying stage may optionally employ molten, anhydrous lithium nitrate as a heating medium. The anhydrous lithium nitrate may contain varying but generally low proportions of molten potassium nitrate and sodium nitrate. The molten lithium nitrate may be circulated through the hollow flights of the conveyor heating system. The molten lithium nitrate can be produced from an interim lithium nitrate product in a subsequent process stage.

When compared to the process embodiment that solely employs neutralisation, this alternative embodiment can require additional energy and equipment. However, this alternative embodiment can minimise the formation of additional lithium nitrate. This is because most of the excess nitric acid is removed from the system without it having to be neutralised by recycled alkaline lithium compounds (e.g. hydroxide and/or carbonate). This, in turn, can minimise the extent of recycle of chemical intermediates (lithium nitrate and alkaline lithium compounds e.g. hydroxide and/or carbonate) through the total process.

In one embodiment, a primary solids-liquids separation stage (e.g. a filtration stage) may be added immediately after the leaching stage. The primary solids-liquids separation stage can be employed before any operations are undertaken to neutralise or otherwise remove (by e.g. distillation) the free excess nitric acid present in the product slurry from the leaching stage.

In this regard, the product of leaching of the calcined (β) spodumene ore concentrate with an excess of nitric acid has been observed to form a filter cake that is readily filterable and highly amenable to washing in the primary solids-liquids separation stage. This means that lithium values (and other metals rendered soluble by the nitric acid and therefore leached into solution) can be washed efficiently from the residual solids with minimum quantities of water. These residual solids become an inert solid tailings product that can be disposed of safely and conveniently by, for example, using it as landfill (although this is by no means the only possible use that may be found for this material). The filtrate from the solids-liquids separation stage can comprise a clear solution (i.e. pregnant liquor) that is strongly acidic (i.e. due to its still-high nitric acid concentration). This solution can contain essentially all of the lithium values leached from the calcined spodumene ore concentrates, along with some aluminium, iron and other metal values leached from the spodumene, as soluble nitrates.

When a primary solids-liquids separation stage is employed, the treatment of the resultant pregnant liquor may follow either of two treatment paths, which paths share similarities to those as set forth above.

More specifically, and as set forth above, the first treatment path can comprise directly neutralising the free acid using an alkaline solution or slurry comprised of recycled lithium hydroxide and/or lithium carbonate. As set forth above, this results in the formation of a precipitate of insoluble and sparingly soluble oxides and hydroxides, including of aluminium, iron and other transition metals, and the alkaline earth metals magnesium and calcium.

In the first treatment path, these precipitated solids may be removed in a separate (secondary) solids-liquids separation stage. For example, this separate stage may comprise clarification followed by filtration of a thickened underflow slurry of precipitated solids. This thickened slurry may be handled separately such as by e.g. filtering and washing it to produce a dewatered cake largely free of soluble lithium values. The dewatered cake may be disposed of, along with the washed solids from the primary filtration stage. What remains is a clarified solution of lithium nitrate, made up of both that solution comprising the lithium values leached from the spodumene, and that solution from the neutralisation (by the recycled alkaline lithium hydroxide/lithium carbonate solution/slurry) of nitric acid surplus to the quantity consumed extracting the lithium and other metal values actually leached from the spodumene.

In the second treatment path, the pregnant solution may, instead of being heated (e.g. by molten $LiNO_3$) in a screw conveyor, be first heated until most of the liquid values, comprised of water and free nitric acid, are evaporated off. This first heating can occur, for example, in a mechanical vapour compression evaporator. This first heating can leave behind a concentrated solution of lithium nitrate (plus some other soluble impurities).

This concentrated solution, which will still be acidic because of the presence of some nitric acid that was not distilled off, may then be neutralised, as set forth above, i.e. with recycled lithium hydroxide and/or carbonate solution/slurry. This will have the effect of rendering insoluble, the aluminium, iron and other transition metals, and importantly, the alkaline earth metals magnesium and calcium, initially present as nitrates. This has the effect of converting these impurities to insoluble oxides and hydroxides, and producing more lithium nitrate in solution. This concentrated, pH-neutral solution can then be processed in equipment that is similar to that used for the further processing of the neutralised solid mass (i.e. that mass that results from the process variation in which the product of the leaching reactor was not filtered before its surplus nitric acid values were distilled off and/or neutralised).

In all process embodiments, the nitric acid and water vapours, together with oxides of nitrogen and some oxygen from the decomposition of the nitrates of aluminium, iron and other transition metals, may be collected for use in regenerating nitric acid (e.g. a solution of nitric acid can be produced in a dedicated nitric acid production plant, which acid may then be reused in the process).

In one embodiment, these volatiles can first be passed into a distillation column, wherein much of the nitric acid and water vapour first condense, to yield a solution of nitric acid that is concentrated to a level appropriate for recycle to the spodumene leaching stage.

In another embodiment, these volatiles can be passed directly to the nitric acid production plant downstream.

In all process embodiments, the product of the aforementioned stages can be a hot, concentrated aqueous solution of lithium nitrate. This solution may also contain small quantities of the nitrates of the alkali metals sodium and potassium. This solution may be further processed in the course of converting the contained lithium values to the desired chemicals: lithium hydroxide and lithium carbonate. Two alternative variations can be employed.

In a first variation, the entire concentrated solution of lithium nitrate may be progressively heated in a sequence of operations, ultimately to a temperature in excess of ~700° C. Whether a single item of plant and equipment, or a series of items of plant and equipment, may be used to achieve this heating, the lithium nitrate solution undergoes three changes. Firstly, it is evaporated to dryness, with water distilled off. Secondly, with further heating to above 260° C., the solid crystalline mass of lithium nitrate is caused to melt and become a mobile liquid. Thirdly, with heating of this liquid to above 600° C., the lithium nitrate is caused to decompose to lithium oxide (Lithia), with the emission of oxides of nitrogen and some oxygen.

The first and second stages of heating (i.e. to above 260° C. and preferably to around 400° C.) may be carried out in any of a range of commercially available items of equipment, for example, an insulated, covered tank or series of similar tanks, each fitted with an agitator to maintain solids in suspension. Such tank(s), together, may hold a substantial inventory (e.g. at least one hour's detention time) of molten lithium nitrate at a temperature controlled to around 400° C. The contents of the tank may be maintained at this temperature by being continuously circulated, such as by dedicated pumps and piping, through a heat-recovery unit. The heat-recovery unit can perform the function of a molten lithium nitrate heater. The heat-recovery unit can take the form of a convective heat exchanger that can draw heat from the hot flue gases exiting the lithium silicate (e.g. spodumene) calciner. In this stage of heating, residual water contained in the feed may be flashed off as steam (which may be directed to join with the steam and other volatiles from the prior and subsequent heating stages). Any insoluble solids can be maintained in suspension by the agitators configured with the tank(s).

In an embodiment, appropriate quantities of hot molten lithium nitrate may be drawn off to be circulated through items of plant that require the heating of the materials being processed in them. These items may include, notably, the thermal drying of the product of the leach reactor in the aforementioned hollow-flight screw conveyor. Similarly, the molten lithium nitrate can be used to heat the filtrate/overflow from a washing and filtration step (i.e. in a secondary solids-liquid separation stage, where this stage is installed immediately downstream of a leach/mix reactor).

In the second variation, the process may further comprise a first crystallisation stage. In this stage, the concentrated solution of lithium nitrates from leaching (and any additional downstream purification) may be further concentrated and then crystallised to form relatively pure crystalline $LiNO_3$. The first crystallisation stage may employ an evaporator/crystallizer.

However, prior to the first crystallisation stage, and in the case of process embodiments that do not involve a primary solids-liquids separation stage immediately downstream of the leaching stage, the dried solids that are produced by the distilling of excess nitric acid and water vapour can be mixed with solution that is separated from the crystalline $LiNO_3$ produced in the first crystallisation stage, along with controlled quantities of process water. This mixing can occur in a process stage that is arranged subsequent to the drying stage (e.g. in one or more process vessels). In this mixing stage, a proportion of the recycled LiOH and/or $Li_2CO_3$ products (e.g. as an aqueous solution/slurry) can also be added to neutralise the solution (i.e. to bring the resultant solution mixture close to pH neutral) as well as to dissolve all soluble lithium values present in the dried solids. The mixing can be performed so as to form a slurry of lithium nitrate solution and residual insoluble solids.

The resultant crystallised $LiNO_3$ from the first stage crystallization (often referred to by those familiar with crystallization as a "First Strike") is typically in slurry form, and may be separated from this solution, such as by centrifugation. On the other hand, the solution that is separated from the crystalline $LiNO_3$ may be recycled to the first crystallization stage, with a proportion of this solution optionally being treated to remove soluble impurities present therein so as to prevent their build-up in the process.

In all process embodiments, a side-stream treatment regime may be employed to prevent the build-up of soluble impurities in the process.

In the side-stream treatment regime, an appropriate portion of the concentrated lithium nitrate solution that remains after most of the lithium nitrate has been crystallised from it, may be withdrawn for further treatment in order to reject as much as practicable of the alkali metal nitrates (sodium and potassium) from the system while minimising the losses of lithium values from the total process.

In an embodiment, this side stream may be cooled, whereupon additional lithium nitrate will crystallise, given that the solubility of lithium nitrate in aqueous solution falls sharply as the temperature falls. Such a second-stage crystallisation may be known to those familiar with crystallisation as a "Second Strike". The resultant crystal-rich slurry may be passed to a dedicated filtering-type centrifuge that is similar to but e.g. smaller than, the main lithium nitrate crystal separation centrifuge. Alternatively, a separation centrifuge comparable in capacity to that employed in the first-strike crystal centrifugation process may be operated intermittently. In either case, the resultant crystal-rich slurry may be held in temporary storage in an agitated tank. Depending on their purity, the mass of separated crystals may be returned to the feed tank that supplies the primary lithium nitrate crystallizer, where they may be re-dissolved and re-crystallized to join the main lithium nitrate crystal product. However, if sufficiently pure, the lithium nitrate from the second-strike crystallization may simply join the product of the primary (first-strike) crystallizer.

In the side-stream treatment regime, the liquor recovered from centrifugation of the second-strike crystal slurry, which by now is relatively enriched in sodium and potassium values, may be treated with the appropriate quantity of a soluble carbonate. In one embodiment, sodium carbonate (i.e. soda ash) can be employed. As is known, the soda ash causes the lithium values to precipitate as sparingly soluble lithium carbonate, leaving additional sodium/potassium nitrate in solution.

In an embodiment of the side-stream treatment regime, the concentrated liquor from the second-strike crystallizer may be held at temperatures in excess of 60° C., and optionally more than 80° C., so as to maximise the precipitation of lithium carbonate, which becomes less soluble in aqueous solutions as the temperature rises.

In an embodiment of the side-stream treatment regime, the lithium carbonate crystals may be filtered out from the liquor and washed with hot water. Depending on the quantity and their purity, these crystals may be added to a final lithium carbonate product. In another embodiment, these crystals may be returned to the neutralization plant to neutralize excess nitric acid. While the quantities will typically be small (i.e. this will depend ultimately on the make-up of the lithium silicate concentrates that originally enter the process refinery), the residual blend of sodium and potassium nitrates may find value as fertilizers. In this way, the process can be operated such that the loss of lithium values from side-stream purification can be very small (i.e. well below 1% of the total quantity of lithium (as lithium silicate mineral concentrates) entering the refinery.

In another embodiment of the side-stream treatment regime, ammonium carbonate may be used to precipitate the lithium values as lithium carbonate. In this embodiment the ammonium carbonate may be made by using an aqueous ammonia solution (ammonia can be used elsewhere in the process) to scrub a portion of the flue gases from the lithium silicate mineral concentrates calcination reactor. The barren liquor resulting from lithium carbonate precipitation, being a mixture of primarily ammonium, potassium and sodium nitrates, can also be valued as a fertilizer, and at a minimum be able to assist with the re-vegetation of mining spoil heaps and tailings emplacements.

The combined crystallised $LiNO_3$ (i.e. from the primary and secondary strikes) that is separated from the solution may be subjected to thermal treatment, for example, at a temperature that causes decomposition of the $LiNO_3$ into solid lithium oxide (lithia) $Li_2O$, i.e. a temperature above 600° C. During this thermal decomposition, a gaseous stream, including oxides of nitrogen, can be produced. This stream may be passed to the nitric acid production plant to produce nitric acid for use in the process.

Prior to thermal decomposition of the crystallised $LiNO_3$, the crystallised $LiNO_3$ may be melted, such as in a heated holding vessel (i.e. similar to that described for the first variation of the process, where the lithium nitrate is not crystallised). As heretofore described, the $LiNO_3$ may be maintained in a molten state by heat exchange with, for example, gaseous by-products that result from the initial thermal activation treatment (e.g. calcination) of the silicate mineral. As also heretofore described, a proportion of the molten $LiNO_3$ may be passed for use as the heating medium in the drying stage (e.g. circulated through the hollow flights of the drying conveyor) and possibly elsewhere in the plant as described hereafter.

The thermal treatment may employ a roaster, such as a bubbling-type fluidized bed roaster that is directly heated by air heated by the combustion of a fuel. So as to avoid contamination of the lithium nitrate/lithium oxide system with carbon dioxide (i.e. which would lead to the formation of lithium carbonate, an undesired intermediate at this stage of the process), the thermal treatment can comprise burning of a fuel that does not form carbon dioxide upon combustion. For example, the fuel may comprise ammonia (e.g. anhydrous gaseous ammonia) which can be burnt in an excess of air in the presence of a suitable catalyst, such as a platinum-rhodium matrix or mesh, using equipment familiar to those skilled in the art of nitric acid manufacture.

The combustion of ammonia in air in the presence of such a suitable catalyst has the advantage of producing additional oxides of nitrogen (rather than nitrogen gas) as follows:

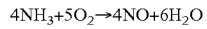

$$4NH_3 + 5O_2 \rightarrow 4NO + 6H_2O$$

These oxides of nitrogen may be passed along with the balance of the flue gases (including from the decomposition of the lithium nitrate) to the nitric acid production plant, where they may contribute to the production of additional nitric acid, to the point where losses of nitric acid that inevitably occur as it is recycled in the overall process are made up in part, if not in full. Here, it can be seen that the combustion of ammonia to fuel the lithium nitrate decomposition process adds to the production of nitric acid for use in leaching of the silicate mineral.

In an embodiment, the process may further comprise a slaking stage. In this stage, a controlled amount of typically pure water (such as distilled water or demineralised water) may be added to the $Li_2O$ produced in thermal treatment. The amount added may be sufficient to convert the $Li_2O$ to LiOH, and to cause all of the LiOH to dissolve into solution.

In this embodiment, the resultant slurry from the slaking stage (i.e. that comprises LiOH in a near-saturated solution), may be subjected to a second crystallization stage. In the second crystallisation stage, the solution of lithium hydroxide may be concentrated and crystallised to form pure crystalline lithium hydroxide monohydrate ($LiOH.H_2O$). This can form one product of the process.

The second crystallization stage can provide for additional purification of the lithium hydroxide. Further, the process and system can produce lithium hydroxide early in the overall flowsheet, in contrast to prior art processes, where it must be produced from lithium carbonate by a more complex lithium counterpart of the known causticising reaction: $Li_2CO_3 + Ca(OH)_2 \rightarrow 2LiOH + CaCO_3$.

In an embodiment, the crystallised $LiOH.H_2O$ may be separated from solution, such as by centrifugation. The separated crystallised $LiOH.H_2O$ may be further processed as required. This further processing may comprise (a) drying the crystals and optionally milling them to a specified particle size. The further processing may also comprise (b) further heating the dried crystals under reduced pressure conditions to a temperature of at least 180° C. This can drive off the water of crystallization to thereby create an anhydrous lithium hydrate product of the process. The water vapour that is distilled off may be collected and condensed to produce additional pure process water for use elsewhere in the process.

In an embodiment, the heating medium for the concentration and crystallisation of lithium hydroxide monohydrate, and (if required) the dewatering and removal of water of crystallization of the crystallized lithium hydroxide monohydrate, may be molten lithium nitrate, such as that produced as described above.

In an embodiment, the lithium hydroxide solution that is separated from the crystalline $LiOH.H_2O$ may be divided such that a first proportion of the solution can be recycled to the leaching process for use in terminating the reaction of the silicate mineral with the nitric acid (i.e. to neutralise residual nitric acid that hasn't been consumed in the leaching (digestion) stage). As heretofore described, this terminates the reaction of the silicate mineral with the nitric acid such that the further impurities are not leached into the solution. Such recycle is resorted to whether or not there has been a preliminary heating step in which excess nitric acid contained in the product of the leaching reactors is neutralised directly, or is first heated to the point where most of the volatiles (including nitric acid and water) are distilled off. As heretofore described, the quantity of lithium hydroxide recycled can be substantially less if much of the free nitric acid is distilled off rather than having to be neutralised.

In an embodiment, the second proportion that is divided from the separated lithium hydroxide solution may be used in the scrubbing of carbon dioxide from process off-gases. For example, the second proportion of lithium hydroxide solution can be used to scrub carbon dioxide from a flue gas that is produced during pre-treatment (e.g. calcination) of the lithium-containing silicate mineral, prior to mixing the mineral with the nitric acid solution.

In this embodiment, scrubbing carbon dioxide from the flue, etc. gases, using the lithium hydroxide solution, can produce a lithium carbonate-rich stream. A proportion of this may be lithium carbonate in solid form. The solid lithium carbonate can be separated from the stream as a lithium carbonate product of the process. For example, the lithium carbonate in solid form may be classified (e.g. using a hydrocylone and then separated e.g. using a centrifuge of the solid-bowl decanter type. or rotary vacuum-drum filter or horizontal belt vacuum filter). A coarser fraction of the classified and separated solid lithium carbonate may form the lithium carbonate product of the process. A finer fraction may be recycled for reuse in the scrubbing of the carbon dioxide from the flue, etc. gases.

Thus, the process as disclosed herein also makes use of a lithium hydroxide-lithium carbonate system. Lithium hydroxide is moderately soluble in water, with the resultant solution having a strong affinity for carbon dioxide. The lithium hydroxide is able to react with the carbon dioxide to form lithium carbonate. On the other hand, lithium carbonate is sparingly soluble in water. Thus, when a relatively concentrated solution of lithium hydroxide is brought into contact with a gas stream containing carbon dioxide, the lithium carbonate that is formed, and that exceeds its solubility under the prevailing conditions, will precipitate as crystals from the solution. The conditions under which this reaction can occur include temperatures in the system above those at which the meta-stable salt lithium bicarbonate can form, namely, solution temperatures above 60° C. Hence, the flue, etc. gas scrubber is typically operated to be above this solution temperature.

Also disclosed herein is a system for recovering lithium from a lithium-containing silicate mineral. The system comprises a leaching reactor in which a mixture of the silicate mineral and nitric acid is subjected to conditions such that lithium values in the silicate mineral are leached into an aqueous phase as lithium nitrates.

The system can further comprise various process apparatus, as set forth above, and as hereafter described in further detail.

Also disclosed herein is a process for scrubbing carbon dioxide from a process off-gas. The process comprising passing the off-gas and a LiOH solution through a scrubbing vessel such that the LiOH is able to react with the carbon dioxide to form $Li_2CO_3$.

This process may form a part of the process and system as set forth above, and as hereafter described in further detail.

BRIEF DESCRIPTION OF THE DRAWINGS

Embodiments of a process and system will now be described with reference to the following drawings, which are exemplary only, and in which.

DETAILED DESCRIPTION OF SPECIFIC EMBODIMENTS

The following description discloses a number of embodiments of a process and system for producing lithium hydroxide and lithium carbonate in varying proportions from spodumene and other lithium-rich metal silicate ores using a recyclable nitric acid leach solution. The process and system can also capture carbon dioxide from flue gases produced elsewhere in the total process and, at the same time, produce lithium carbonate.

Figure 1:
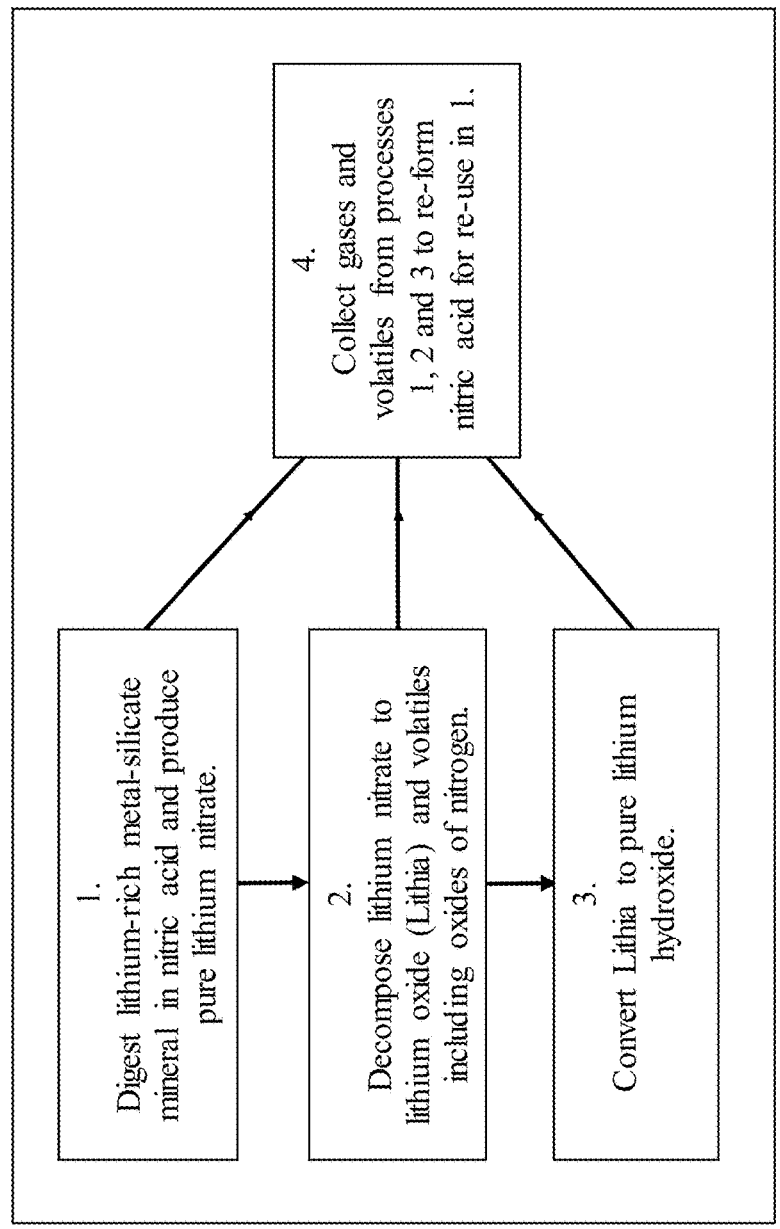
FIG. 1 is a basic block diagram of a process for recovering lithium from a lithium-containing silicate mineral.

Referring firstly to FIG. 1, and in general overview, the process as disclosed herein can be seen as comprising the following stages or steps:
1. Digestion of a lithium-rich metal-silicate mineral in nitric acid and production of pure lithium nitrate.
2. Decomposition of the lithium nitrate to lithium oxide (Lithia) and volatiles, including oxides of nitrogen.
3. Conversion of Lithia to pure lithium hydroxide.
4. Collection of gases and volatiles from processes 1, 2 and 3 to re-form nitric acid for use in 1.

Thus, the process can be as virtuous, in that nitric acid is able to be recycled therein. In addition, when ammonia is used as a fuel for stage 2. of FIG. 1, further oxides of nitrogen can be produced to re-form the nitric acid, and thereby account for any losses of this acid elsewhere in the total process.

Two variations of the process and system will be described herein in detail. A first process variation will be described in relation to the process and system embodiment of FIG. 3. A second process variation will be described in relation to the process and system embodiment of FIG. 4. However, it should be understood that the two process and system variations are not to be interpreted as being mutually exclusive, in that aspects of one can be applied to the other, or may be combined, etc.

Figure 2:
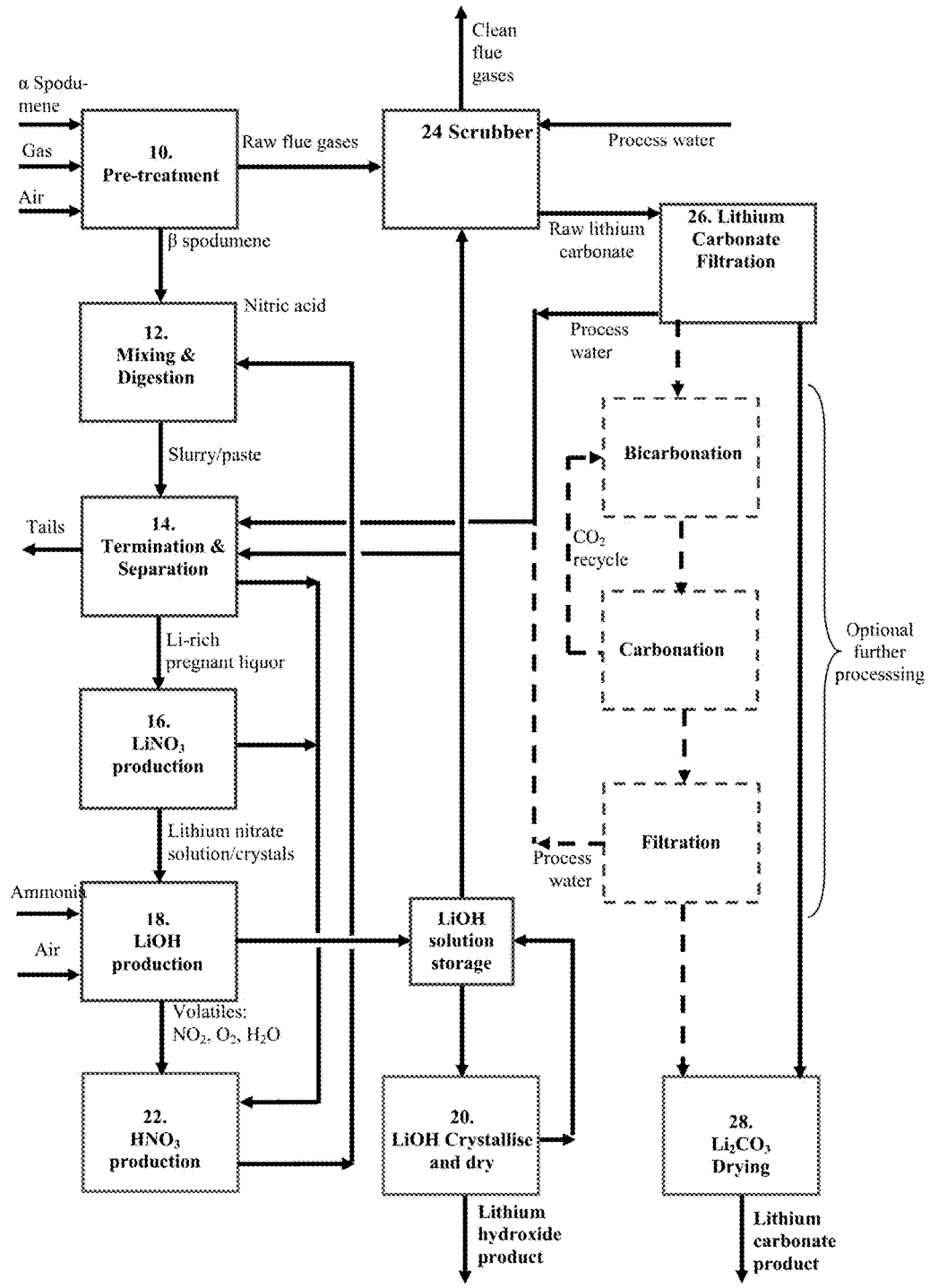
FIG. 2 is a generalised block diagram of a process and system for recovering lithium, as lithium hydroxide and lithium carbonate, from a lithium-containing silicate mineral.

Prior to describing the detailed embodiments of FIGS. 3 & 4, an embodiment in the form of a generalised flowsheet of the process and system (i.e. that covers both process variations) will first be described in relation to the block diagram of FIG. 2. The process and system of FIG. 2 can be seen to comprise the following stages:

Pre-Treatment Stage 10 (FIG. 2)

In this stage, illustrated by the reference numeral 10 in FIG. 2, the silicate mineral is pre-treated to produce a treated (e.g. activated) silicate mineral.

For example, the pre-treatment stage can be employed to convert an α (alpha) form of the mineral (e.g. α-spodumene) to a β (beta) form of the mineral (e.g. β spodumene). Usually the pre-treatment stage comprises a thermal pre-treatment step, but it can solely comprise a non-thermal (e.g. mechanical) pre-treatment step.

When the pre-treatment stage comprises thermal pre-treatment, the step of thermally treating the silicate mineral can bring about a thermal phase transition in, and/or removal of a volatile fraction of, the silicate mineral. The thermal treatment step can be undertaken in a first reactor such as a calciner or a roaster.

When the thermal pre-treatment step comprises calcining, the calcination is typically undertaken in the presence of air or oxygen, but at temperatures below the melting point of the silicate mineral. The calcination can be undertaken in a variety of calciners such as: a calcining kiln such as a rotary kiln, a fluidised bed calciner, a flash calciner, a transport calciner, or other suitable apparatus generally familiar to persons skilled in the high-temperature processing of mineral materials.

The thermal pre-treatment stage is operated to increase the temperature of the silicate mineral to well above ambient temperature. For example, the thermal pre-treatment stage can increase the temperature of the silicate mineral to at least about 1000° C. or 1100° C. The maximum temperature of the thermal treatment step will be limited, as understood by a skilled person, to a temperature that does not risk vitrification of solids, making them resistant to leaching. For example, a calcination temperature around 1050° C. is required for the 'decrepitation' of α spodumene to the more reactive β form.

Once thermally treated, the silicate mineral is in a more reactive (e.g. β-) form. The more reactive form is, accordingly, more susceptible to chemical attack, including by acids either in the absence or in the presence of water.

The thermal treatment step can, as an option, comprise an additional non-thermal treatment step that follows thermal treatment. For example, this may involve fine or even ultrafine grinding. The additional fine grinding can be performed in a roller mill to cause the silicate mineral to be in particulate form. The particulate nature of the treated silicate mineral can provide for a greater surface area for subsequent reaction. The size of the particles following grinding can be less than about 300, 200, 100 or 70 microns or even finer. The optimal size distribution can be determined on a case-by-case basis.

When the pre-treatment stage entirely comprises a non-thermal pre-treatment step, it can comprise a mechanical treatment step such as ultrafine grinding. For example, the entire conversion of e.g. α-spodumene to β-spodumene can be achieved wholly by mechanical means (i.e. without thermal processing such as by calcination or roasting). The imposition of intense mechanical shear induced by high-intensity/ultrafine grinding in a stirred mill (such as an ISAMILL™) can bring about the desired activation of e.g. α-spodumene.

Mixing and Digestion Stage 12 (FIG. 2)

In this stage, illustrated by the reference numeral 12 in FIG. 2, the pre-treated silicate mineral (β-spodumene in FIG. 1) is mixed with a mineral acid, in this case nitric acid ("Nitric acid" recycle in FIG. 1). The nitric acid can be produced by an on-site nitric acid production plant (stage 22 in FIG. 2). The mixing stage 12 can comprise a tank (e.g. that is continuously stirred) or an in-line mixer. In mixing stage 12 silicate mineral is blended into/slurried with an aqueous phase containing the nitric acid. The resultant mixture/blend can take the form of a solution, slurry or paste ("Slurry/paste" in FIG. 2).

For example, calcined β spodumene solids can be slurried with concentrated nitric acid (at least 40% and preferably at least 60% acid) from the nitric acid plant, together with process water as required, to achieve the appropriate form of the slurry or paste, e.g. containing ~50-60 wt. % insoluble solids (i.e. of the calcined β spodumene). The quantity of nitric acid added is sufficient to convert all of the lithium in the spodumene to lithium nitrate (stoichiometric quantity); the excess can be as much as 40% or even 100% again of the stoichiometric quantity.

Depending on whether mineral leaching is a pressurised leach, the pressure of the slurry leaving the mixing stage 12 may be raised by way of a pump to the working pressure of the digester/leaching reactor.

The mixture (solution, slurry or paste) of pre-treated silicate mineral and nitric acid ("Slurry/paste") is now subjected to a digestion/leaching reaction. The reaction conditions are adjusted so that the mixture rapidly reacts to produce a slurry comprising, for example, lithium nitrate in the aqueous phase, and residual mineral solids.

As will be explained in more detail hereafter, the reactor in which the treated silicate mineral is reacted with nitric acid can comprise a digester, which may take the form of a single or continuous pressure vessel (such as a single or continuous autoclave), or a non-pressure vessel such as a tank or tower (e.g. a vertical hopper or silo reactor). The reactor can also take the form of one or more pipelines, or one or a series of stirred and pressurised vessels, or a number of interconnected and agitated compartments contained within a single pressure vessel, etc. The particular reactor configuration that is selected from this range, for a particular project, can depend upon the characteristics of the lithium-rich metal silicate ore.

In the digester/leaching reactor the concentrated nitric acid (i.e. in surplus/stoichiometric excess) continues to react, but more rapidly, with the silicate mineral to ensure full/complete leaching of lithium values in the silicate mineral into the aqueous phase as the soluble salt lithium nitrate. The pH of the contents of the reactor in this stage can be controlled to be strongly acidic, preferably between pH 1 and pH 3, in order to maximise the leaching of lithium in a minimum period of time.

As set forth above, the reactions can proceed at ambient/atmospheric pressure. Alternatively, the reactions can be conducted at elevated pressures of at least 5 Bar, possibly 10 Bar and even 20 Bar. The reactions typically employ elevated temperatures >100° C. such as 120° C., possibly 160° C. and even as high as 200° C., as appropriate for the particular lithium-rich metal silicate ore being leached.

Termination and Solids Separation Stage 14 (FIG. 2)

In the Termination and Separation stage 14 of FIG. 2, the reaction of nitric acid with residual mineral solids in the "Li-rich slurry" (FIG. 2) is terminated, and solids residues are separated. This serves to minimise the leaching of non-lithium values into the aqueous phase. Non-lithium values present in the silicate mineral can include aluminium, iron, nickel, chromium, manganese, cobalt, calcium, magnesium, sodium, potassium and phosphate ion. However, by adjusting the conditions in the Termination sub-stage, any non-lithium values can be separated (e.g. precipitated, etc) out of the aqueous phase and returned into the solid residue (i.e. to be removed from the process as tailings).

Termination

In one variation, the slurry can be neutralized (e.g. using a portion of the ultimate product of the process/system, such as lithium hydroxide, lithium carbonate, etc). The quantity of neutralising solution added to the product stream is controlled to bring the pH conditions to near neutral (i.e. to between pH 6 and pH 7). This promptly causes all acid leaching activity to cease.

In the Termination sub-stage, in order to minimise the quantity of lithium hydroxide and/or lithium carbonate that needs to be recycled, most of the nitric acid surplus to the quantity consumed in converting lithium values in the lithium-rich ore to lithium nitrate, can first be removed. In another variation this removal occurs by heating and substantially drying the slurry. The resultant dried cake from heating can be re-slurried and then neutralized.

In either variation, heating and/or neutralizing serves to terminate the reaction of the nitric acid with the mineral solids, thereby minimising the extraction of non-lithium values.

Nitric acid is known to form an azeotropic mixture with water, of composition 68% nitric acid and 32% water. Thus, when it is heated in the Termination sub-stage, the mixture boils (i.e. distils) under atmospheric pressures at approximately 120° C. to form a vapour phase. This distilled vapour phase can be collected and passed to the nitric acid production plant (stage 22 in FIG. 2). Water present in the stream that is excess to that required to form this azeotropic mixture will also be removed by distillation to add to the vapour phase. It is to be understood that, if higher pressures are used in the digester/leaching reactor (e.g. 5-20 Bar), the temperatures at which these vapour phases form will be higher than those required should atmospheric pressures only be applied in the digester/leaching reactor (i.e. in accordance with the laws of elevation of boiling points of solutions under elevated pressure conditions).

The heating in the Termination sub-stage can take place in a dryer (such as a hollow-flight conveyor). The dryer can be heated e.g. with molten lithium nitrate as its heating medium, an intermediate product of the process/system (e.g. the molten lithium nitrate may be circulated through the hollow flights of the conveyor). The heating occurs progressively to temperatures that are sufficient, firstly, to remove by evaporation much of the surplus nitric acid and water to form the vapour phase, and then, secondly, sufficient to decompose any nitrate salts of aluminium, iron and other base metals present as impurities in the metal silicate ore. The heating can produce a relatively dry solids cake, which can then be passed to a neutralisation vessel in which it can be slurried with e.g. process water and a solution/slurry of lithium hydroxide/lithium carbonate product solution to be neutralized to ~pH neutral.

The neutralising in the Termination sub-stage can take place in a neutralisation vessel, such as a continuously stirred tank reactor, or a series of such reactors. In the neutralisation vessel(s) the slurry can be afforded sufficient time for the neutralisation of excess nitric acid to proceed to completion.

However, when solely neutralisation is employed in the Reaction Termination sub-stage, the exit stream from the Digestion/Leaching sub-stage can first be mixed with the neutralisation solution (e.g. recycle lithium hydroxide solution) in an in-line mixer, after which the mixture can flow to and enter a reactor/surge vessel. Where the Digestion/Leaching sub-stage employs a pressure vessel, this passage can occur with minimal fall in pressure. The pressure in the reactor/surge vessel can be maintained and controlled (e.g. by means of compressed air from an air compressor).

Solids Separation

In the Solids Separation sub-stage lithium nitrate in an aqueous phase comprised primarily of a concentrated lithium nitrate solution is separated from the slurry comprised of the insoluble residue of the treated mineral (mostly silica and alumina values). The lithium nitrate can subsequently be recovered from solution, such as crystalline $LiNO_3$ in an evaporation/crystallization sub-stage of Stage 16 (below).

In one variation (described in detail below with reference to FIG. 4), and prior to a Termination sub-stage that comprises neutralising of the mixture, the insoluble residue of treated mineral can be subjected to a primary solids-liquids separation sub-stage, such as filtration. The separated solids residue can be removed from the process as tailings.

After the Termination sub-stage (i.e. after neutralising or drying), the Solids Separation sub-stage can separate, as a clarified solution, the lithium-rich aqueous phase from the now-barren insoluble mineral residue concentrates. The Solids Separation sub-stage employs separation apparatus to separate and to wash insoluble solids from the slurry, and to then produce the barren tailings in solid form that may be safely and permanently emplaced.

The solids removal can be by way of filtration to produce a washed filter cake. More than one stage of filters may be used (e.g. plate-and-frame filters, rotary vacuum-drum filters, etc).

In one variation (described in detail below with reference to FIG. 4), where a primary solids-liquids separation sub-stage has been employed, and prior to a final filtration stage, any remaining solids residue in the process solution/slurry can first be subjected to a clarification stage (e.g. in one or more settling vessels). This can ensure that the resultant clarified liquor that is passed onto subsequent stages of the process is essentially free of solids residue. A solids underflow from the clarification stage can be handled separately such as by filtering and washing it to produce a dewatered cake largely free of soluble lithium values. The dewatered cake may be disposed of, along with the washed solids from the primary solids-liquids separation sub-stage.

In the Solids Separation sub-stage, when the Digestion Stage 12 operates under elevated pressures, plate and frame filter presses fitted with cake wash facilities may be used; the pressure of the feed stream to the filters can be close to the operating pressure of the digester, thereby avoiding the need to reduce the pressure of this stream via elaborate pressure-reduction equipment. At atmospheric pressures, filters such as rotary vacuum drum filters with cake wash facilities, and horizontal belt filters with cake wash facilities, can be employed. The arrangement eventually selected for removing insoluble solid materials will depend upon the characteristics of the solids present, such as whether or not they are free-draining. The washed filter cake can form a stable residue consisting primarily of silica and alumina, plus certain other insolubles depending upon the composition of the original mineral concentrate, but likely to contain other silicate minerals, iron ore values (chiefly goethite), magnesite, limestone (calcite and aragonite) and ilmenite.

With the insolubles removed, the soluble lithium cations along with any other soluble cations and the soluble anions primarily nitrate can be collected as a clarified solution for further reaction. The solution can be referred to as clarified or pregnant liquor. Other alkali metals (sodium and potassium) and even traces of alkaline earth (calcium and magnesium) metal ions may also be present in solution (should such metals be present in the original silicate mineral fed to the second reactor).

Lithium Nitrate Production Stage 16 (FIG. 2)

In this stage, illustrated by the reference numeral 16 in FIG. 2, an intermediate lithium nitrate product is produced. The lithium nitrate can be produced either as a clarified, concentrated solution (FIG. 4), or in an evaporation and crystallization sub-stage (FIG. 3).

In the evaporation/crystallization sub-stage, the clarified liquor containing the lithium nitrate in solution is subjected to evaporation and crystallization, where the lithium nitrate solution is concentrated by evaporation to produce lithium nitrate crystals. This sub-stage can comprise a mechanical vapour recompression mechanism, wherein a vacuum pump lowers the pressure over the contents of the vessel, until such time as the aqueous phase begins to boil. Water vapour is compressed by the vacuum pump and returned as an adiabatically heated vapour to the shell-side of the calandria in the vessel. Condensed water is collected for re-use elsewhere in the process. Lithium nitrate is highly soluble in water, and its solubility increases rapidly as temperature rises. The evaporator/crystallizer thus includes a section where the contents are further slowly cooled (e.g. in a heat exchanger such as a spiral-type, cooled in turn by a cooler fluid such as cooling water, cooled in turn by an air-cooled condenser, or by an evaporative cooling tower), whereupon more lithium nitrate crystallises from solution to form a dense crystal slurry.

This crystal-dense slurry is then passed to apparatus for separating and dewatering the lithium nitrate crystals from the crystalliser slurry, and for returning the largely solids-free lithium nitrate solution to the crystalliser system. Such apparatus can comprise a centrifuge, such as a solid-bowl decanter, screen-bowl decanter, conical-screen or pusher-screen type. The dewatered crystal mass is conveyed to the next stage (lithium hydroxide production), while the filtrate, a concentrated solution of lithium nitrate, is returned to the evaporator/crystalliser.

Side-Stream Purification

The evaporation/crystallization sub-stage may also comprise apparatus for treating a side-stream (bleed-stream) of the filtrates produced by the separating apparatus used to dewater lithium nitrate crystals. This treating apparatus can include the further crystallisation of lithium nitrate (to be returned to process), leaving a solution concentrated in sodium and potassium ions (whose concentrations will continue to increase unless these metals are removed from time to time using this treating apparatus) and only a minimum of lithium ions. This concentrated solution may then be treated with a soluble carbonate e.g. sodium carbonate, or ammonium carbonate Ammonium carbonate may be produced by reacting an aqueous ammonia solution with carbon dioxide present in the flue gases (e.g. from the calcination stage). In either case, the addition of a soluble carbonate precipitates most of the remaining lithium values as sparingly soluble lithium carbonate, which may then be recycled. The remaining solution is suitable for disposal or for use as a fertiliser because of its relatively high available nitrogen content, and potassium values.

Lithium Hydroxide Production, Stage 18 (FIG. 2)

In this stage, illustrated by the reference numeral 18 in FIG. 2, the lithium nitrate from the Lithium Nitrate Production Stage 16 is converted to lithium oxide. During such conversion, the off gases that are produced (including nitrogen dioxide and other oxides of nitrogen, and oxygen) are collected and used to make more nitric acid; i.e. they are transferred to a nitric acid production plant (stage 22 in FIG. 2).

More specifically, the dewatered lithium nitrate crystals from the separating apparatus of stage 16 are passed to a stirred and heated vessel (e.g. a covered, insulated/jacketed tank) wherein the lithium nitrate crystals are heated as they are added to the contents of the tank. The tank contents are maintained at a temperature sufficient to melt the lithium nitrate crystals (>250° C.; at least to 260° C. and typically to 400° C.). The tank is partially filled with the molten lithium nitrate such that, upon entering the molten lithium nitrate, the lithium nitrate crystals rapidly melt, adding to the contents of the tank. The temperature of the tank contents can be maintained by continuously circulating the contents of the tank to, and then through, the tubes of a convective heater. These tubes can, in turn, be heated by the exiting hot flue gases from e.g. the calciner of Pre-treatment stage 10 (i.e. the flue gases exiting the calciner can be at temperatures of ~800-900° C.). The resultant heated molten salt can be returned to the tank.

The melting of the lithium nitrate aids in its feeding to the subsequent decomposition reactor, where the lithium nitrate is then better able to decompose to form lithium oxide. Moreover, the molten lithium nitrate can also be employed as an effective heat-transfer medium (e.g. in the dryer (hollow-flight conveyor) of the Termination sub-stage; and in the drying apparatus (hollow-flight screw conveyor) of the lithium hydroxide evaporation/crystallization sub-stage).

The contents of the molten lithium nitrate salt tank are pumped to the lithium nitrate decomposition reactor in which the molten lithium nitrate is further heated either: directly (such as by a hot gas stream produced from the combustion in air of a fuel); or indirectly (wherein the hot gas stream, which may be generated by, for example, by the combustion in air of natural gas or any other suitable clean fuel including carbon-containing fuels, but which does not come into contact with the lithium nitrate). The decomposition produces solid lithium oxide ($Li_2O$-lithia).

The decomposition reactor can take the form of a bubbling fluidized bed roaster fired by the combustion of a fuel in air/oxygen. In such case, the fuel should preferably contain no carbon, such as hydrogen or ammonia, typically anhydrous ammonia. Of the two, ammonia has a number of advantages. These include it being relatively inexpensive and convenient to transport and store. In addition, when it is burnt in air (as opposed to oxygen), in the presence of a suitable catalyst (such as a platinum-rhodium alloy wire gauze), it forms additional oxides of nitrogen which, when transferred to the nitric acid plant, will add to the total production of nitric acid there. Thus, the ammonia can serve to replenish in part or in full, any nitric acid losses in the process.

The decomposition reactor operates at a temperature of a minimum 600° C., preferably 650° C. and as much as 750° C. At these temperatures the lithium nitrate decomposes to form a mixture of lithium oxide which, in the environment of the reactor, naturally forms prills or pellets within the fluidized bed. The reactor emits a gaseous stream of oxides of nitrogen including nitrogen dioxide and nitric oxide, along with some oxygen from the decomposition of nitrate ions. Also contained in this gas stream are some water vapour as well as additional nitric oxide and other oxides of nitrogen from the combustion of the ammonia, plus nitrogen and depleted levels of oxygen from the combustion air.

Lithium Hydroxide Production Stage 20 (FIG. 2)

In this stage, illustrated by the reference numeral 20 in FIG. 2, the lithium oxide from the decomposition reactor is first converted to lithium hydroxide by adding and blending it with the appropriate amount of water. This can take place in a slaking vessel (e.g. a continuously stirred tank) to produce a concentrated solution of lithium hydroxide.

The concentrated solution of lithium hydroxide from the slaking vessel then passes to a second evaporator/crystalliser apparatus (e.g. also of the mechanical vapour recompression type). Here, the solution is further concentrated such that lithium hydroxide is caused to crystallize in the solution and form crystalline lithium hydroxide monohydrate. The quantity of lithium hydroxide monohydrate crystals produced (as a proportion of all lithium hydroxide entering the crystalliser unit) may be controlled, as may be desirable, for example, to meet customer demands for lithium chemicals in the form of lithium hydroxide. A resultant slurry from the evaporator/crystallizer of crystalline lithium hydroxide monohydrate is then separated and dewatered to produce highly-pure lithium hydroxide monohydrate crystals from a balance of the lithium hydroxide which remains as an aqueous solution. The separation and dewatering apparatus can comprise a centrifuge, such as of the solid-bowl or screen-bowl decanter type, or continuous conical screen type, or it may comprise a pusher or vibrating screen type centrifuge.

The Lithium hydroxide production stage 20 can additionally comprise apparatus for drying, and driving off the water of crystallization from the produced lithium hydroxide monohydrate crystals, to produce a pure anhydrous lithium hydroxide product capable of meeting specific market specifications. The drying apparatus can comprise a fully enclosed hollow-flight screw conveyor, wherein hot molten lithium nitrate can be circulated through the hollow flights. A current of nitrogen gas circulates in a closed-circuit arrangement through the void space of the hollow-flight screw conveyor, whereby the lithium hydroxide monohydrate crystals are eventually heated to a temperature in excess of 160° C., sufficient to drive off the water of crystallization. The resultant pure, anhydrous lithium hydroxide can then be ground and packed as a product of the process/system.

The Lithium Hydroxide Crystallization stage 20 can further comprise apparatus (e.g. a covered tank "LiOH solution storage" on FIG. 2) for collecting and holding the saturated lithium hydroxide solutions remaining after the crystals of lithium hydroxide monohydrate have been removed (i.e. the filtrate/centrifuge centrate). The filtrate/centrate comprises a saturated aqueous solution of lithium hydroxide, which is collected in the covered tank. A little water (as well as other liquid streams) is added to dilute the tank contents such that there is no risk of ongoing crystallization of lithium hydroxide from solution.

This solution is then conveyed (e.g. pumped from the tank using separate pumps) in appropriate quantities to be recycled to the nitric acid distillation dryer, and to the pH neutralisation of any remaining/surplus/excess nitric acid in the products of digestion/leaching in the Termination sub-stage. A balance of the solution can be conveyed to a flue gas scrubber (of Scrubber Stage 24), where it is used to absorb/capture carbon dioxide contained in the flue, etc gases, by converting it to sparingly soluble lithium carbonate.

Nitric Acid Production Stage 22 (FIG. 2)

In this stage, illustrated by the reference numeral 22 in FIG. 2, the off-gases from the decomposition of the lithium nitrate are passed to a "Nitric acid plant". The excess nitric acid and water vapours that are distilled off in the distillation dryer (hollow-flight conveyor) of the Termination sub-stage can also be passed to the nitric acid plant. The nitric acid plant can take the form of one, or a series of, absorption towers, such as those used in conventional nitric acid plants.

In the nitric acid plant (the operations of which will be familiar to those familiar with the commercial production of nitric acid by way of the Ostwald Process) the off-gases and distilled vapours are absorbed in a circulating stream of a continuously chilled solution of nitric acid in water to manufacture more nitric acid, suitable for recirculation to the digestion/leaching reactor. This produces a concentrated solution of nitric acid (at least 40% acid and preferably at least 60% acid) that is appropriate for use in the digestion/leaching reactor. The oxides of nitrogen formed from the catalysed combustion of ammonia in air (in the lithium nitrate decomposition sub-stage) add to the total quantity of nitric acid produced and, in this manner, losses of nitric acid from the total process by, for example, imperfect washing of tailings or imperfect conversion of nitrogen oxides to nitric acid in the nitric acid plant, can be made good.

Scrubber Stage 24 (FIG. 2)

In this stage, illustrated by the reference numeral 24 in FIG. 2, filtered flue gases comprising carbon dioxide are scrubbed with the balance of concentrated lithium hydroxide solution produced in the Lithium Hydroxide Production Stage 20. Whilst the flue gases are primarily produced during thermal treatment of the silicate mineral, they may be sourced externally. The circulating and distributed solution absorbs/captures carbon dioxide contained in the flue, etc gases, by converting it to sparingly soluble lithium carbonate.

The flue gas scrubber can take the form of a largely empty chamber (e.g. tower) through which the concentrated lithium hydroxide solution is circulated and distributed via banks of sprays and at a relatively high volumetric rate. The lithium hydroxide reacts with carbon dioxide present in the flue gases and, in the process, is converted to lithium carbonate. Because this is sparingly soluble, most of it precipitates from solution, converting the circulating scrubbing medium into a slurry of lithium carbonate in a lithium hydroxide-rich aqueous phase.

Lithium Carbonate Filtration Stage 26 (FIG. 2)

In this stage, illustrated by the reference numeral 26 in FIG. 2, the precipitated ("raw") lithium carbonate crystals are classified so as to remove a proportion of the precipitated lithium carbonate crystals that continuously form in the lithium hydroxide-rich slurry circulating through the flue gas scrubber.

More specifically, the slurry of lithium carbonate in a lithium hydroxide-rich aqueous phase is pumped through a bank of hydrocyclones. The hydrocyclone spigot product (underflow stream) contains a dense slurry of coarser-size fraction of lithium carbonate crystals, which can be further separated from (i.e. dewatered and washed of) their associated solution in e.g. a centrifuge, such as a solid-bowl decanter centrifuge; or in a rotary drum vacuum filter apparatus, etc.

The bulk (balance) of the liquid phase (lithium hydroxide solution) from the bank of hydrocyclones (overflow stream), together with finer lithium carbonate crystals and the solution separated (i.e. as a result of dewatering and washing) from the dense slurry of coarser-size lithium carbonate, are recirculated through the flue gas scrubber of Scrubber Stage 24.

Controls are fitted to the hydrocyclones to adjust the diameter of their spigots to allow the volumetric split between spigot and overflow streams to be adjusted as required.

Lithium Carbonate Drying Stage 28 (FIG. 2)

In this stage, illustrated by the reference numeral 28 in FIG. 2, the separated, coarser-size fraction of lithium carbonate crystals are subsequently dried and packed as a suitable (e.g. pure) lithium carbonate product of the process/system.

Other unit operations can be included in the overall process and system shown in FIG. 2, in line with good engineering practice, in particular, for the provision of services and utilities, the efficient utilisation of waste heat, the conservation of water, and the minimisation of all waste streams. These can include Bicarbonation and Carbonation units, familiar to those familiar with traditional processes for the refining of lithium-rich materials including brines, as shown in dotted outline FIG. 2. These units may be justified if there is a market for exceptionally pure lithium carbonate.

First Process & System Embodiment (Variation 1)

Figure 3:
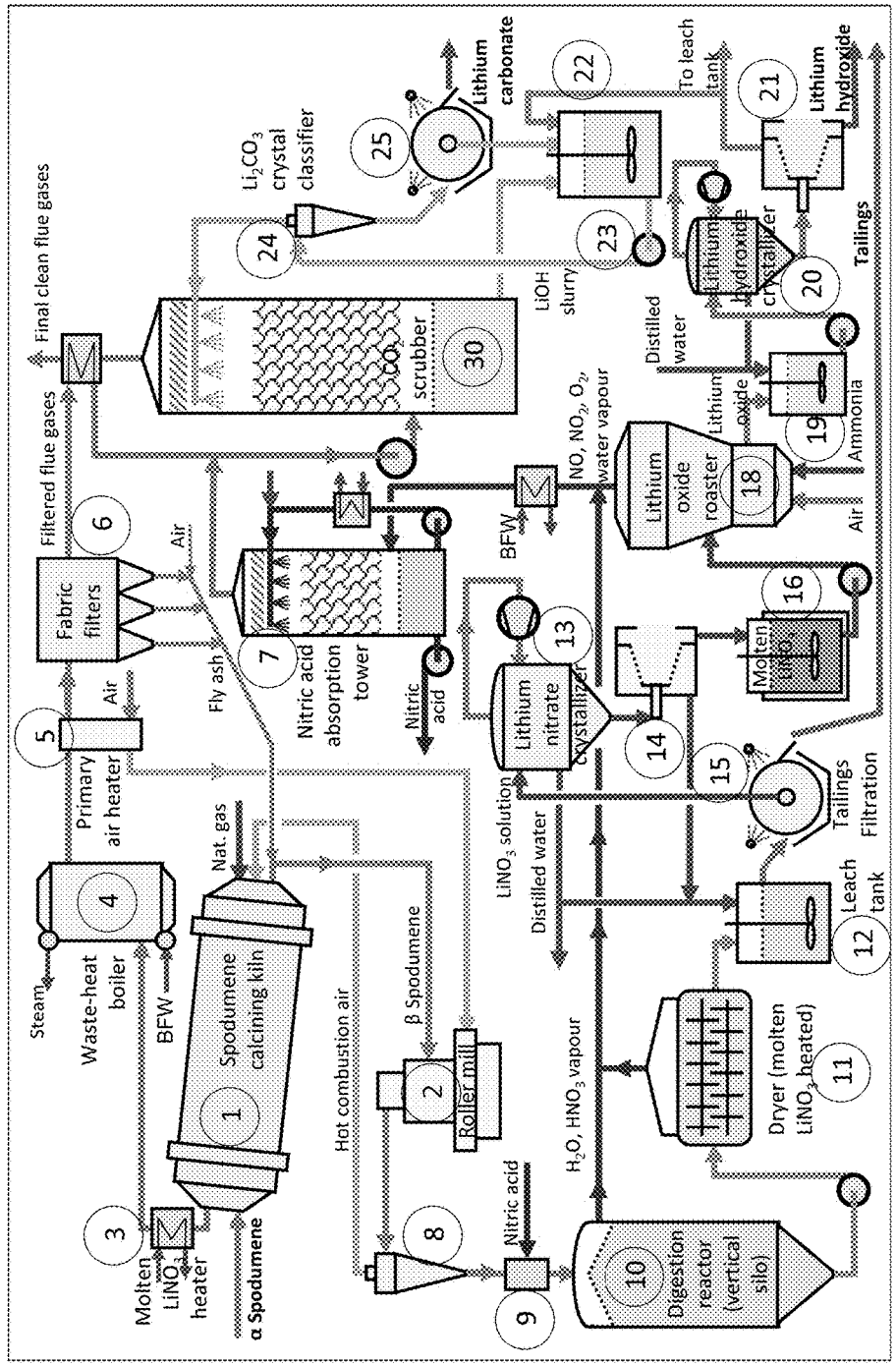
FIG. 3 is a schematic flow diagram that schematically illustrates one specific embodiment of the process and system.

Referring now to FIG. 3, a first specific process and system embodiment for recovering lithium from a lithium-containing silicate mineral is schematically depicted.

In the first process and system embodiment of FIG. 3, α spodumene as a filter cake containing on average 10 percent water by weight, is fed into a first reactor in the form of a natural gas-fired rotary kiln 1, operating at a temperature around 1,050° C. as required for the 'decrepitation' of the α spodumene to the more reactive β form. Too-high temperatures risk vitrification of solids, making them resistant to leaching.

Most of the calcined β spodumene product from the calciner 1, partially cooled by the counter-current flow of hot gases and solids through the rotary kiln, passes to an air-swept dry grinding mill 2, for example a roller or table mill as commonly used for grinding (pulverizing) coal and other relatively soft rocks e.g. limestone.

The hot combustion gases contain the balance of the calcined β spodumene product from the calciner 1. These gases are passed through one or more of a convective-type molten-salt heater 3, to heat to a temperature of approximately 400° C. A flow of molten lithium nitrate is used as the heat-transfer medium in the heater 3. As described below, the molten lithium nitrate can be used at various locations throughout the total plant. The heated gases are then passed a waste-heat boiler 4, to generate high-pressure steam for use elsewhere in the process, and (in an embodiment) for electricity generation. As a result, the hot combustion gases from the calciner 1 are partially cooled in the waste-heat boiler 4. They are further cooled in the primary air heater 5, where some more of their sensible heat is transferred to ambient air destined for use as combustion air in the calciner 1.

The cooled combustion gases from the primary air heater 5 are cleansed of their burden of flue dust (the finer-sized portion of calcined β spodumene) by passing them through a fabric filter station 6. The calcined β spodumene solids removed at station 6 are transferred pneumatically (using air as a carrier) to join the main flow of calcined β spodumene from the calciner 1 and then pass to the grinding mill 2. Using heated air from the air pre-heater 5, the ground calcined β spodumene solids pass to a bank of dust cyclones 8, where these solids are separated from the air used to transport them. This now-heated air is ducted to the calciner 1 for use as combustion air.

The densified underflow of the dust cyclone bank, the calcined β spodumene solids, passes to a mixing vessel in the form of an in-line mixer 9, to be slurried with concentrated nitric acid from the nitric acid plant 7 and process water as required to achieve the appropriate conditions, to form a slurry or paste containing of the order of 60% insoluble solids (the calcined β spodumene) by weight. The mixing vessel can also take the form on a continuously stirred tank reactor.

The quantity of nitric acid added to the mixing vessel exceeds that required to convert all of the lithium in the spodumene to lithium nitrate (the stoichiometric quantity). In this embodiment, the reaction between the nitric acid and calcined spodumene is undertaken at atmospheric pressure; other embodiments may resort to elevated pressures.

The slurry then passes into the digestion reactor 10. The still-hot calcined solids from the dust cyclones 8 transfer their heat to the slurry, heating it to the working temperature of the reactor 10. In reactor 10, under the prevailing conditions of ambient pressure and 100-120° C. temperature, the lithium values in the silicate mineral ore are leached out in accordance with reaction (1) below.

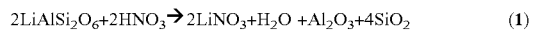

β spodumene nitric acid Lithium nitrate

In practice, the temperature of the exit stream from reactor 10 will be at least as high as its inlet temperature, as reaction (1) is exothermic.

The exit stream from reactor 10, which in this embodiment takes the form of a vertical enclosed silo, passes to a solids-heating system 11, which in this embodiment takes the form of a fully enclosed hollow-flight screw conveyor. Molten lithium nitrate is circulated through the hollow flights of the heating system 11, which also serves to convey the exit stream from reactor 10 along its length. In the course of their passage, the exit stream, a paste, is progressively heated, initially to at least 100° C. and preferably 120° C., whereupon water and nitric acid are evaporated; for the most part as an azeotropic mixture comprised of 68% nitric acid and 32% water. Once the paste has thus been dried to a cake, this cake is further heated by the molten salt circulating through the hollow flights of the heating system/conveyors to a temperature in excess of 155° C. At this temperature, any aluminium nitrate formed (from the reaction between nitric acid and the aluminium values in the spodumene ore) is decomposed:

The nitric acid is evaporated off, leaving solid aluminium hydroxide.

In this way, much of the free acid is driven from the cake, so tendencies to continue the leaching of aluminium and other impurity base metals e.g. ferric iron, nickel, cobalt and others, are greatly slowed if not entirely stopped. The nitric acid-rich vapours from reactor 10 and (particularly) heating system 11 are ducted to the nitric acid plant 7.

The dry product from reactor 11 is now slurried with distilled water (condensate) in a mixing/leach tank 12 (which may be two or more tanks aligned in series). The quantity of water added is sufficient to convert the contents to a pumpable slurry. Also added to the contents is an appropriate quantity of lithium hydroxide solution, which is manufactured elsewhere in the total process as described below. Lithium hydroxide solution, which is strongly alkaline, is used to neutralise any excess nitric acid remaining after the lithium values in the spodumene accessible to leaching have been converted to lithium nitrate under the prevailing conditions, in accordance with reaction (1) and surplus nitric acid has been distilled off in accordance with reaction (2). Were this excess acid not neutralised, it will tend to continue to attack the now-barren spodumene, possibly causing increased quantities of aluminium, silicon, and any of the base metals (any of the transition metals including but not limited to chromium, manganese, iron, cobalt and nickel), and alkaline earth metals (in particular magnesium and calcium) to be leached, and converted into soluble salts, hence be present in solution in the aqueous phase. The quantity of lithium hydroxide added is sufficient to raise the pH number to near neutral, i.e. between pH values of 6 and 7. The neutralisation reaction may be written thus:

Whereupon it is seen that the product of the reaction is more lithium nitrate, to join that resulting from reaction (1).

In the mixing/leach tank(s) 12, the highly soluble lithium nitrate present in the solids mass from reactor 11 dissolves in the water that is blended with it to form a slurry comprised of a concentrated solution of lithium nitrate, and barren solids, mainly those on the right-hand side of reaction (1).

The contents of the mixing/leach tank(s) 12 are pumped to a solids-liquids separation stage. As shown in FIG. 3 this is in the form of a rotary drum vacuum filter 15, but it is equally likely that a horizontal belt vacuum filter could be used. The filtration stage raises the solids concentration of the filter cake up to ~85% by weight and, by means of hot washwater, essentially all solubles (including all soluble lithium values) are washed from the filter cake. The filtrate will therefore contain essentially all of the lithium values leached from the spodumene ore concentrates, but now as soluble lithium nitrate. The filter cake, essentially devoid of lithium, and consisting of stable silica, alumina and perhaps other metal oxides present in much lower quantities, may be safely emplaced for long-term storage (i.e. tailings).

The filtrate (which may also be referred to as pregnant liquor) flows (such as by way of pumps, piping and a holding tank, not shown for clarity in FIG. 3) into a unit in the form an evaporator/crystallizer vessel 13. In the embodiment shown in FIG. 3 this vessel 13 is based on the principle of mechanical vapour recompression, with evaporation occurring at close to atmospheric pressure, and with the vapour re-compressed for re-use in the heating calandria (an internal part of the evaporation vessel not shown on FIG. 3). Water vapour condensing in the calandria is condensed and collected for re-use elsewhere in the process as pure process water, in particular for recovering lithium values in the filter cakes formed in the dewatering filter 15. The other product is a slurry of lithium nitrate crystals in a saturated solution of lithium nitrate, perhaps with small quantities of impurities also in solution. During operation this slurry is circulated through the evaporator/crystallizer 13. A proportion of this slurry is withdrawn from this main circulating flow and sent to a centrifuge 14, such as of the solid-bowl decanter type, or screen-bowl decanter type, or a continuous conical screen type, or a pusher or a vibrating screen type. The mass flow rate at which crystal slurry is withdrawn and fed to the dewatering centrifuge is set such that the mass rate of crystal production (as cake from the centrifuge 14) matches the rate that new lithium nitrate solution is fed to the evaporator/crystallizer 13.

It follows that there will be a continuous build-up (albeit at a slow rate) of other soluble salts, in particular sodium and potassium ions, in the aqueous phase of the crystal slurry circulating through the evaporator/crystallizer 13. Not shown on FIG. 3, but nevertheless a part of the process, is that a portion of the filtrate from the centrifuge is further cooled to relatively low temperatures e.g. below 40° C. Upon such cooling, much of the lithium nitrate remaining in solution precipitates in crystalline form to form a slurry of lithium crystals in an aqueous phase now containing substantially less lithium nitrate in solution, along with sodium and potassium ions and possibly traces of other ions in solution. A small centrifuge such as of the solid-bowl decanter type is employed to separate the crystals from the aqueous phase. The separated crystals are returned to the evaporator/crystallizer 13, while the centrate is collected in a tank and periodically removed for benign disposal, complete with its burden of sodium and potassium ions.

Further processing to recover additional lithium values can be justified. For example, by mimicking processes widely used in the recovery of lithium values from lithium-rich brines found in the 'salars' of the South American 'Lithium Triangle', sodium carbonate (soda ash) can be added as a solution to precipitate most of the residual lithium as sparingly soluble lithium carbonate:

$$2LiNO_3 + Na_2CO_3 \rightarrow Li_2CO_3 + 2NaNO_3 \quad (4)$$

The lithium carbonate precipitate can be removed by conventional solids-liquids separation processes, such as by vacuum filtration and washing with hot water. Depending on its quantity and purity, this lithium carbonate can be added to the final product lithium carbonate, or can be recycled to the digestion reactor 10. The sodium nitrate will merely add to that already present in the barren solution.

The dewatered mass of lithium nitrate crystals from the centrifuge 14 is conveyed to a heated holding vessel in the form of a molten lithium nitrate holding tank 16. The contents of this tank are maintained at close to 400° C., at which temperature the salt is a clear, colourless highly mobile liquid. Lithium nitrate crystals entering the holding tank 16 and then falling into the molten lithium nitrate soon melt to add to the mass of molten lithium nitrate. The contents of this tank are maintained at this temperature by circulating them continuously through the molten lithium nitrate heater 3 (for reasons of clarity, FIG. 3 does not show the pump and piping interconnections). Also from this holding tank 16, molten lithium nitrate is pumped or otherwise distributed as required to supply the heat energy necessary for the correct operation of the dryer 11, and potentially to other parts of the overall process including, as necessary, pre-heating the charge to the digestion reactor 10.

Molten lithium nitrate is transferred as required to the lithium oxide roaster 18, wherein the crystals are heated rapidly to a temperature in excess of 600° C., ideally 700° C. The lithium oxide roaster can be a bubbling fluidized-bed reactor, comprised of two fluidized beds stacked vertically. The upper bed is formed of pellets or prills of lithium oxide, operating at a temperature of the order of 700° C. As soon as molten lithium nitrate, which is sprayed or otherwise distributed over the bubbling bed solids, contacts the solids it is rapidly heated and, in the process, it decomposes to form lithium oxide, with the emission of nitrogen dioxide and oxygen according to reaction (5):

$$4LiNO_3 \rightarrow 2Li_2O + 4NO_2 + O_2 \quad (5)$$

In FIG. 3, the roaster 18 is directly fired by a fuel that does not form carbon dioxide upon combustion; in this embodiment the fuel is anhydrous ammonia. It is burned in air in the presence of a heated platinum-rhodium gauze catalyst, whereupon the combustion products, namely, water vapour, nitric oxide and air depleted in oxygen, blend with the nitrogen dioxide and oxygen from the decomposition of the lithium nitrate. The reaction for the catalytic combustion of ammonia in air may be written as:

$$4NH_3 + 5O_2 \rightarrow 4NO + 6H_2O \quad (6)$$

The nitric oxide upon cooling (e.g. through the convective gas cooler, which is used to heat boiler feedwater—BFW in FIG. 2) combines with free oxygen present in the combustion gases to form nitrogen dioxide:

$$2NO + O_2 \rightarrow 2NO_2 \quad (7)$$

The nitrogen dioxide, along with that formed from the decomposition of lithium nitrate according to reaction (4), plus water and free oxygen, plus the off-gases from the dryer 11, pass to the nitric acid plant, where they all combine to form nitric acid:

$$H_2O + 2NO_2 + O_2 \rightarrow 2HNO_3 \quad (8)$$

The nitric acid plant 7 can be sourced from a company experienced in the design and construction of nitric acid plants from ammonia. However, most of the infrastructure required for the catalytic combustion of ammonia to form oxides of nitrogen in the same manner as presented in reaction (6) would not be required (apart from in a much reduced form—i.e. just for the combustion of the ammonia required to fuel the lithium oxide roaster 18).

The nitric acid plant 7 consists of one or more columns arranged in series, each fitted with sieve trays or bubble caps, through which a cooled mix of nitric acid and water is continuously circulated. This rapidly absorbs the nitrogen dioxide and oxygen (from the combustion off-gases), to form more nitric acid, the concentration of which can be under steady-state conditions, such as 40% acid or higher (a preferred product is at least 60% nitric acid). The nitric acid plant 7 can also comprise a separate fraction column, where the relatively dilute nitric acid produced in the plant is divided into two streams: a concentrated acid (nominally 68% nitric acid) stream, and an aqueous stream containing little if any nitric acid, which may be used as process water elsewhere in the plant. Acid is drawn off at the appropriate rate and transferred to a storage tank (not shown in FIG. 3), from where it may be pumped as required to the digester 10.

A feature of the process disclosed herein is that the inevitable losses of nitric acid from the total system are compensated in part or in full by the additional nitric acid formed from the use of ammonia as the heat source required for reaction (6).

The lithium oxide (lithia), pellets formed in the upper fluid bed of the lithium oxide roaster 18, are partially cooled by arranging for them to fall to a lower fluidized bed through which the combustion air necessary for reaction (6) passes. Partially cooled prills of pure lithium oxide (lithia) are further cooled and quenched in a mixing vessel/agitated storage tank 19. In this regard, a controlled volume of distilled water is added to storage tank 19 (including e.g. condensate from the evaporator/crystallizer 13), whereupon it is converted to lithium hydroxide:

$$Li_2O + H_2O \rightarrow 2LiOH \tag{9}$$

This process is strongly exothermic, so the vessel is continuously cooled using circulating cooling water. The quantity of water added to storage tank 19 is sufficient to dissolve all of the lithium nitrate and to convert it all to the hydroxide, according to reaction (9). The lithium hydroxide is taken fully into solution to form a near-saturated solution of lithium hydroxide.

This near-saturated solution of lithium hydroxide is then transferred to another crystallizer 20. In the lithium hydroxide crystallizer 20, which in the embodiment shown in FIG. 3 is also of the mechanical vapour recompression type, some water vapour is boiled off, causing some crystals of lithium hydroxide monohydrate LiOH.H$_2$O to form in suspension in the now-saturated lithium hydroxide solution. The quantity of water boiled off is carefully controlled so that the quantity of lithium hydroxide monohydrate crystals produced matches the quantity of lithium hydroxide required to meet the particular contracted demand for lithium hydroxide. An appropriate proportion of this slurry is withdrawn from the crystallizer 20 and is sent to a centrifuge 21. In the embodiment of FIG. 3, the centrifuge is of a continuous conical screen type, or it may be of the solid-bowl decanter type, or screen-bowl decanter type, or the pusher or vibrating screen type.

The solid crystalline cake produced by the centrifuge can be further processed (equipment not shown in FIG. 3). First, it may be dried, then packaged for despatching. Alternatively, it may be further heated to drive off the water of crystallization. In both cases, heating may be undertaken in a fully enclosed hollow-flight screw conveyor, similar to that used for the dryer 11, wherein molten lithium nitrate circulates through the hollow flights. A current of nitrogen gas circulates in a closed-circuit arrangement through the void space of the hollow-flight screw conveyor. The lithium hydroxide monohydrate crystals are eventually heated to a temperature in excess of 160° C., sufficient to drive off the water of crystallization:

$$LiOH.H_2O \rightarrow LiOH + H_2O \tag{10}$$

The pure, anhydrous lithium hydroxide may then be ground and packaged, as required under the terms of contracts of sale to customers. The circulating nitrogen gas stream serves to transport water vapour through a condenser, which may be of the indirect contact type; its purpose is to cool the gas/vapour mix to a temperature sufficient to cause much of the water vapour to condense, to yield pure water, able to be used elsewhere in the process. The now less-humid nitrogen gas is returned to the hollow-flight screw dryer/conveyor and the process repeated.

The centrifuge centrate, a saturated aqueous solution of lithium hydroxide, is collected in another covered tank 22, where a little process water (and other liquid streams that also enter tank 22) is added to dilute the solution, so that there is no risk of ongoing crystallization of lithium hydroxide from the solution. From this tank 22, lithium hydroxide solution is pumped using separate pumps, as follows:

to the leach tank 12, in sufficient quantity to neutralise any remaining surplus nitric acid in the product stream from the dryer 11, i.e. to raise the pH number within the leach tank 12 to between 6 and 7, according to reaction (3);

the balance, to the flue gas scrubber 30, using pump 23, where it is used to absorb carbon dioxide contained in the flue gases.

The reaction between the relatively concentrated lithium hydroxide solution circulating through the scrubber 10 can be written as:

$$2LiOH + CO_2 \rightarrow Li_2CO_3 + H_2O \tag{11}$$

The temperature of the circulating slurry (i.e. circulation is maintained by pumps 23) is maintained at a temperature above 60° C. and preferably 80° C. to ensure that no lithium bicarbonate is formed. Lithium carbonate is much less soluble than lithium hydroxide, so most of the lithium carbonate formed according to reaction (10) is precipitated from solution as pure crystals of lithium carbonate. These circulate through the scrubber 30 as components of a slurry of lithium carbonate in a solution of lithium hydroxide (plus some lithium carbonate also in solution). During such circulation, the lithium carbonate crystals tend to grow in size. As the slurry circulates it passes through a classifying device, in FIG. 3 a bank of hydrocyclones 24, that classify out the larger crystals and concentrate them to dense slurry as a spigot product. The remainder of the slurry including most of the solution and the finer crystals of lithium carbonate are returned to the scrubber 10 via the receiving tank 22.

The spigot product passes to a dewatering device 25, in an embodiment a solid-bowl decanter centrifuge (or in the embodiment shown in FIG. 3, a vacuum drum filter). The solid cake of pure lithium carbonate produced is dried, ground and packaged as required under the terms of sale to customers.

Second Process & System Embodiment (Variation 2)

Figure 4:
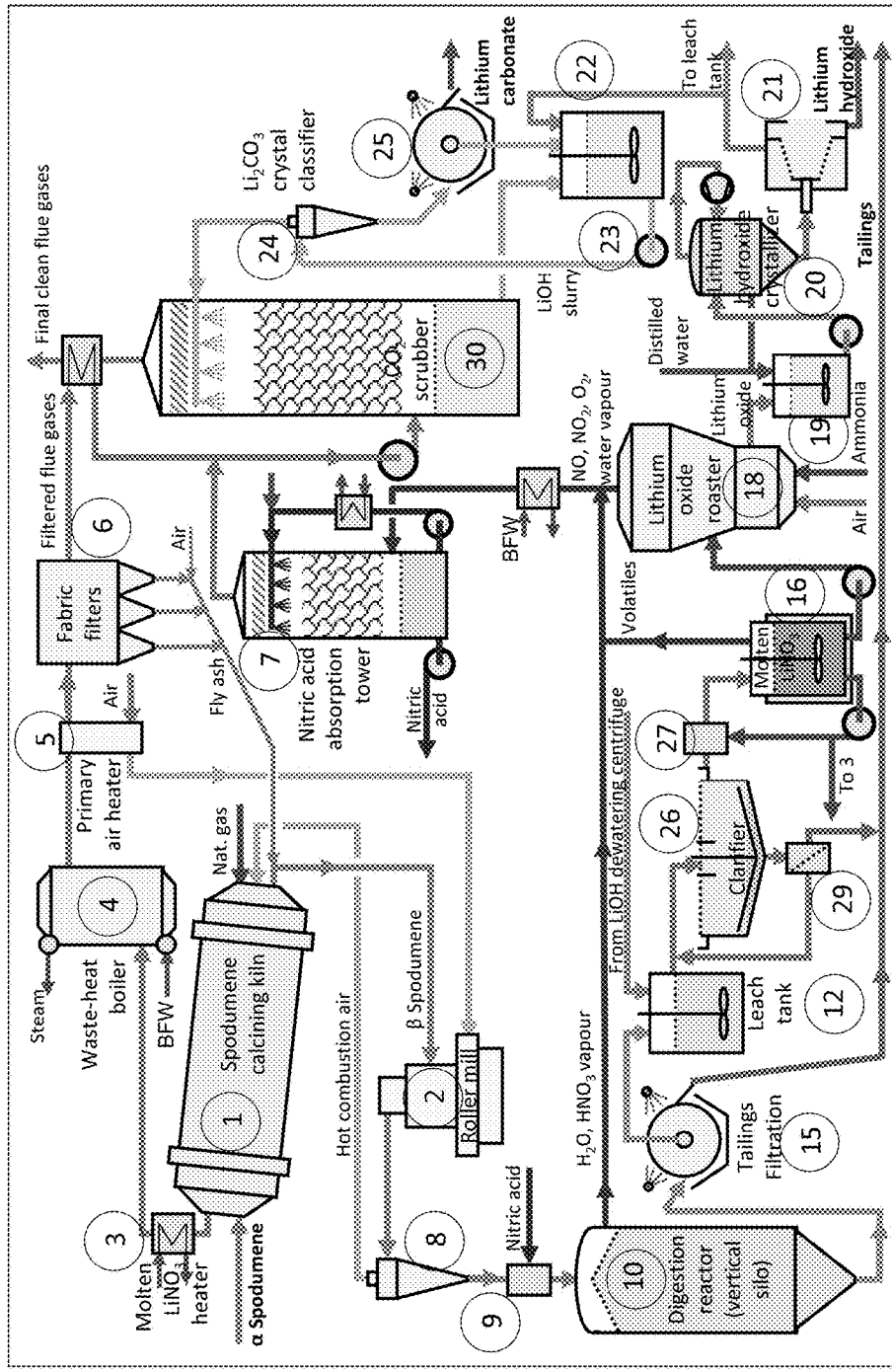
FIG. 4 is a schematic flow diagram that schematically illustrates another specific embodiment of the process and system.

Referring now to FIG. 4, a second specific process and system embodiment for recovering lithium from a lithium-containing silicate mineral is schematically depicted.

In FIG. 4 like reference numbers are used to denote similar or like apparatus to FIG. 3, and hence will not be redescribed. The following process and system variations only will now be described in relation to FIG. 4.

In the variation shown in FIG. 4, from the digestion reactor 10, the leached product mass now passes directly to a tailings filtration unit 15, where the insoluble solids are washed of their solubles, mainly lithium nitrate plus surplus nitric acid, and other soluble nitrates of other metals (i.e. as before described). The insoluble solids are then dewatered, and conveyed away as inert tailings.

The now clarified, yet strongly acidic, filtrate from unit 15 is passed to the leach tank 12 (which may be a series of two or more tanks). Here, its excess acidity is directly neutralised by recycled lithium hydroxide solution from the lithium hydroxide dewatering centrifuge 21. This tends to precipitate, as insoluble oxides and hydroxides, aluminium, iron and other transition metals, magnesium and calcium, all of which will settle. The slurry resultant can be passed to a clarifier 26, where the thickened underflow, which is relatively small in volume, is separately filtered in the filtration unit 29 (wherein the filter cake is also washed and dewatered to recover its lithium values into the filtrate). The filter cake then directly joins the main tailings product from the tailings filtration unit 15, and the filtrate is recirculated to the feed stream to the clarifier 26.

The concentrated solution of lithium nitrate is then transferred (such as by pumps, not shown) to the molten $LiNO_3$ tank 16, the contents of which are maintained at a temperature of 400° C. A special cyclonic mixer/blender 27 is provided to allow for the safe blending of a relatively cool stream containing water, and the hot 400° C. molten lithium carbonate.

The process and system of FIG. 4, removes the solids of the leached product mass early after digestion. It avoids the drying stage 11 and crystallisation stage 13 of FIG. 3. Losses of lithium and nitric acid may, as a result, be higher, but capital and operating costs may be lower. In addition, the lithium nitrate may not be of as high purity.

In comparison, the process and system of FIG. 3 can minimise the formation of additional lithium nitrate. This is because most of the excess nitric acid is removed in the dryer 11 without it having to be neutralised by recycled alkaline lithium compounds. This, in turn, can minimise the extent of recycle of the chemical intermediate (lithium nitrate) through the total process, as occurs with the process and system of FIG. 4.

Otherwise, the process and system of FIG. 4 is the same as the process of FIG. 3.

Further Variations

It is to be understood that the characteristics of the spodumene, whether the original ($\alpha$) or activated ($\beta$) form, may differ to the extent that variations to the above method and system may be appropriate.

Other unit operations could be included in the overall process in line with good engineering practices, in particular, for the provision of services and utilities, the efficient utilisation of waste heat, the conservation of water, and the minimisation of all waste streams. When, the digestion stage 10 is pressurised, the reactor can take the form of one or more autoclaves. Alternatively, it may take the form of one or more vertical silos, fed at the top, and discharged at the base, In order to avoid the need for elaborate pressure-reduction systems, the contents of the digestion stage can pass directly to drying and termination stages designed to also operate at elevated pressures, and ultimately can pass to plate and frame filter presses (for separation and washing of the tailing solids) that also operate with a pressurised feed.

$CO_2$ Scrubbing

The process and system as described herein can also be seen as comprising a discrete process for the scrubbing carbon dioxide from a process off-gas. Such an off-gas can originate from a variety of sources, including especially from a flue gas that is produced during pre-treatment (e.g. thermal treatment, such as by calcining or roasting) of a lithium-containing silicate mineral.

This discrete process can comprise passing the off-gas and a LiOH solution through a scrubbing vessel. The scrubbing vessel can be configured and operated such that the LiOH is able to react with the carbon dioxide to form $Li_2CO_3$. $Li_2CO_3$ is another valuable form of lithium, suitable for use as a feedstock to e.g. battery manufacturers, etc.

The LiOH solution may be a concentrated solution, such as results from the controlled slaking of a lithium oxide intermediate material. The lithium oxide intermediate material can, in turn, be produced by thermally treating a lithium nitrate crystalline material, the latter being produced by leaching a lithium-containing silicate mineral with a solution of nitric acid.

The LiOH solution can be passed counter-currently through a scrubbing vessel such as tower 30 in FIGS. 3 & 4. For example, the LiOH solution can be sprayed down into an upcoming off-gas stream. The tower 30 can comprise intermediate beds, plates, mesh, etc that help to promote the reaction between the $CO_2$-containing off-gas and the LiOH solution. The temperature of the lithium hydroxide solution can be maintained above 60° C., optionally above 80° C., so as to mitigate or prevent the formation of lithium bicarbonate.

The LiOH solution can take the form of a slurry that comprises a relatively fine fraction of $Li_2CO_3$ crystals therein. The relatively fine fraction of $Li_2CO_3$ can help to seed the formation of $Li_2CO_3$ crystals. The relatively fine fraction of $Li_2CO_3$ crystals can be produced by classifying the slurry (e.g. using a hydrocyclone, such as at stage 24 in FIGS. 3 & 4) to produce an overflow stream for feeding/returning to the scrubber 30. This slurry can thus be circulated through the scrubbing vessel.

The classification (e.g. the spigot product underflow from hydrocyclone 24) also produces a stream comprising a relatively coarse fraction of $Li_2CO_3$ crystals, which can be separated (e.g. at stage 25 in FIGS. 3 & 4) to form a lithium carbonate ($Li_2CO_3$) product of the discrete process.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features.

The invention claimed is:

1. A process for recovering lithium from a lithium-containing silicate mineral, the process comprising:
    mixing the silicate mineral with nitric acid;
    subjecting the mixture to a leaching process having conditions such that lithium values in the silicate mineral are leached into an aqueous phase as lithium nitrate;
    separating the lithium nitrate from the aqueous phase;
    subjecting the separated lithium nitrate to thermal treatment, at a temperature that causes decomposition of the lithium nitrate into solid lithium oxide, and such that a gaseous stream that comprises oxides of nitrogen is produced;
    passing the gaseous stream comprising oxides of nitrogen to a nitric acid production stage in which nitric acid is produced for reuse in the leaching process.

2. A process according to claim 1, wherein the leaching process conditions comprise increasing temperature and/or pressure of the leaching process so as to accelerate leaching of lithium values into the aqueous phase as lithium nitrates.

3. A process according to claim 1, wherein the leaching process conditions further comprise reacting the silicate mineral in a stoichiometric excess of nitric acid, for a controlled period of time, with the controlled period of time being terminated by:
    (i) neutralising residual free nitric acid; or
    (ii) heating the product of leaching so as to distil excess nitric acid along with water as vapour.

4. A process according to claim 3, wherein in (i) the residual free nitric acid is neutralised by recycling a proportion of alkaline lithium compounds produced as part of the process for recovering lithium, with the alkaline lithium compounds that are recycled including one or more of: $Li_2O$, $LiOH$ and $Li_2CO_3$.

5. A process according to claim 3, wherein in (i), a leached product mass resulting from the leaching process is first passed to a solid-liquid separation stage in which solids in the leached product mass are separated from a solution comprising lithium nitrate, with the solution then being passed to the neutralisation stage (i), and with the solids being separated from the process as tailings.

6. A process according to claim 3, wherein in (ii) the excess nitric acid and water vapour are distilled off as vapours in a drying stage, with a heating medium for the drying stage optionally comprising molten lithium nitrate produced in a subsequent process stage, and wherein the distilled nitric acid and water vapour are collected for use in regenerating nitric acid.

7. A process according to claim 6, wherein, in a crystallisation stage, the solution of lithium nitrate from leaching is concentrated and crystallised to form crystalline $LiNO_3$.

8. A process according to claim 7, wherein, prior to crystallising the $LiNO_3$, the leached lithium nitrate solution is separated from a residue of insoluble solids of the silicate mineral.

9. A process according to claim 8, wherein in (ii) dried solids that are produced by distilling the excess of nitric acid and water are re-slurried using solution that is separated from the crystalline $LiNO_3$ produced in the crystallisation stage, and additional process water.

10. A process according to claim 7, wherein the crystallised $LiNO_3$ is separated from solution, and wherein the solution separated from the crystalline $LiNO_3$ is passed to a vessel to be mixed with the dried solids that are produced by the distilling off of the excess of nitric acid.

11. A process according to claim 6, wherein a resulting $LiNO_3$ intermediate product is melted, optionally with a proportion of the molten $LiNO_3$ being passed for use as the heating medium in the drying stage in (ii).

12. A process according to claim 11, wherein the molten $LiNO_3$ intermediate product is subjected to said thermal treatment.

13. A process according to claim 12, wherein the thermal treatment comprises burning ammonia in an excess of air and in the presence of a suitable catalyst with the resultant gaseous stream that includes oxides of nitrogen being passed to the nitric acid production stage to produce the nitric acid for reuse in the leaching process.

14. A process according to claim 12, wherein, in a slaking stage, a controlled amount of pure (distilled) water is added to the $Li_2O$ produced in said thermal treatment, the amount being sufficient to convert the $Li_2O$ to $LiOH$ and to cause all of the $LiOH$ to dissolve into solution.

15. A process according to claim 14, wherein, in a further crystallisation stage, the solution of lithium hydroxide is concentrated and crystallised to form pure crystalline lithium hydroxide monohydrate $LiOH.H_2O$, and with the crystallised $LiOH.H_2O$ being separated from solution.

16. A process according to claim 15, wherein the crystallised $LiOH.H_2O$ is further processed by (a) drying the crystals, and (b) further heating the dried crystals under reduced pressure conditions to a temperature of at least 180° C. to drive off the water of crystallization to create an anhydrous lithium hydrate product, and collecting and condensing the water vapour distilled off to produce additional pure process water.

17. A process according to claim 15, wherein the lithium hydroxide solution that is separated from the crystalline lithium hydroxide monohydrate is divided such that:
a first proportion of the solution is recycled to the leaching process for use in terminating a reaction of the silicate mineral with the nitric acid, the lithium hydroxide solution neutralising residual or remaining free nitric acid; and
a second proportion of the solution is used in the scrubbing of carbon dioxide from process off-gases.

18. A process according to claim 17, wherein the second proportion of the solution is used to scrub carbon dioxide from:
a flue gas that is produced during pre-treatment of the lithium-containing silicate mineral, prior to mixing the mineral with the nitric acid; and/or
a flue gas that may be produced during thermal treatment of a lithium nitrate intermediate product of the process; and
wherein the scrubbing of carbon dioxide from the flue gas using the lithium hydroxide solution produces a lithium carbonate stream, with a proportion being lithium carbonate in solid form that is able to be separated from the stream as a lithium carbonate product of the process.

\* \* \* \* \*